US007941092B2

(12) United States Patent
Rao

(10) Patent No.: US 7,941,092 B2
(45) Date of Patent: May 10, 2011

(54) MEDIA DISTRIBUTION SERVER THAT PRESENTS INTERACTIVE MEDIA TO A MOBILE DEVICE

(76) Inventor: Bindu Rama Rao, Laguna Niguel, CA (US)

( * ) Notice: Subject to any disclaimer, the term of this patent is extended or adjusted under 35 U.S.C. 154(b) by 781 days.

(21) Appl. No.: 11/977,764

(22) Filed: Oct. 25, 2007

(65) Prior Publication Data

US 2008/0119132 A1    May 22, 2008

Related U.S. Application Data

(63) Continuation-in-part of application No. 11/821,771, filed on Jun. 25, 2007.

(60) Provisional application No. 60/860,700, filed on Nov. 22, 2006.

(51) Int. Cl.
*H04H 60/09* (2008.01)

(52) U.S. Cl. ............... 455/3.04; 455/466; 455/414.1; 455/3.05; 705/51; 705/14

(58) Field of Classification Search .......... 455/3.04, 455/3.05, 424, 425, 414.1, 456.5, 456.6, 455/456.3, 456.1, 414.2; 705/14, 51; 709/229, 709/224; 725/25, 88, 89, 102, 134, 142
See application file for complete search history.

(56) References Cited

U.S. PATENT DOCUMENTS

| | | | |
|---|---|---|---|
| 2002/0123359 A1* | 9/2002 | Wei et al. | 455/466 |
| 2005/0149501 A1* | 7/2005 | Barrett | 707/3 |
| 2006/0190403 A1* | 8/2006 | Lin et al. | 705/51 |
| 2008/0119133 A1* | 5/2008 | Rao | 455/3.05 |
| 2008/0119167 A1* | 5/2008 | Rao | 455/411 |
| 2008/0163075 A1* | 7/2008 | Beck et al. | 715/759 |
| 2008/0261625 A1* | 10/2008 | Hughes | 455/456.3 |
| 2009/0117845 A1* | 5/2009 | Rao | 455/3.05 |

* cited by examiner

*Primary Examiner* — Tan Trinh
(74) *Attorney, Agent, or Firm* — McAndrews, Held & Malloy

(57) ABSTRACT

A media distribution server presenting interactive media on mobile devices and receives mobile user response interactively. During the presentation of interactive media the user is prompted with multiple choices for their selection, which can be provided using softkeys on the mobile device. The media distribution server prepares the subsequent portions of the interactive media and delivers them to the mobile device. In one embodiment, the necessary text, graphics, audio and video are assembled and integrated dynamically and is presented on the mobile device to the user. Further the mobile user is prompted to approve online purchases, make online appointment requests, show interest in products, etc. while browsing the interactive media on their mobile device. The media distribution server supports such activities as necessary.

22 Claims, 9 Drawing Sheets

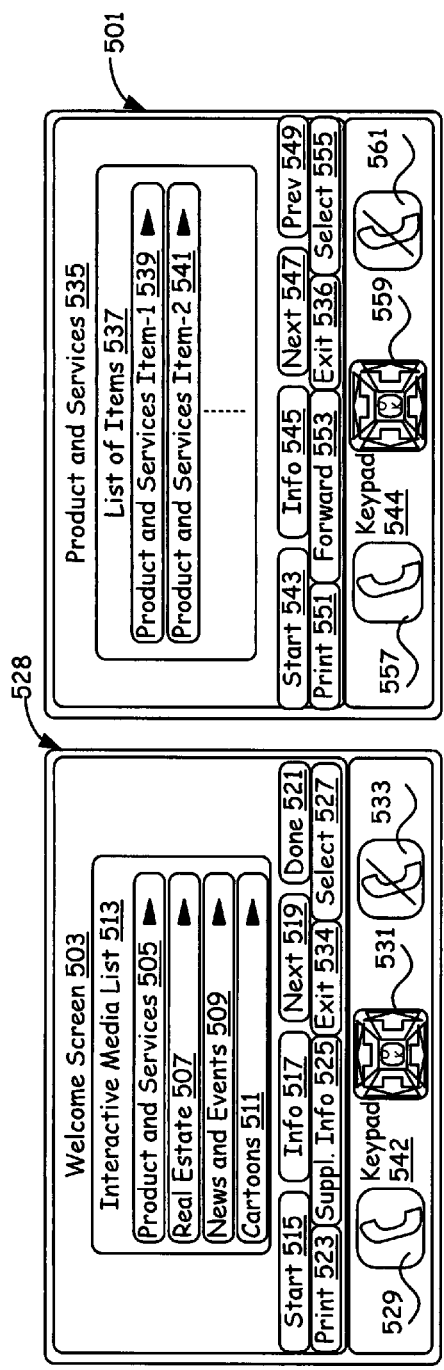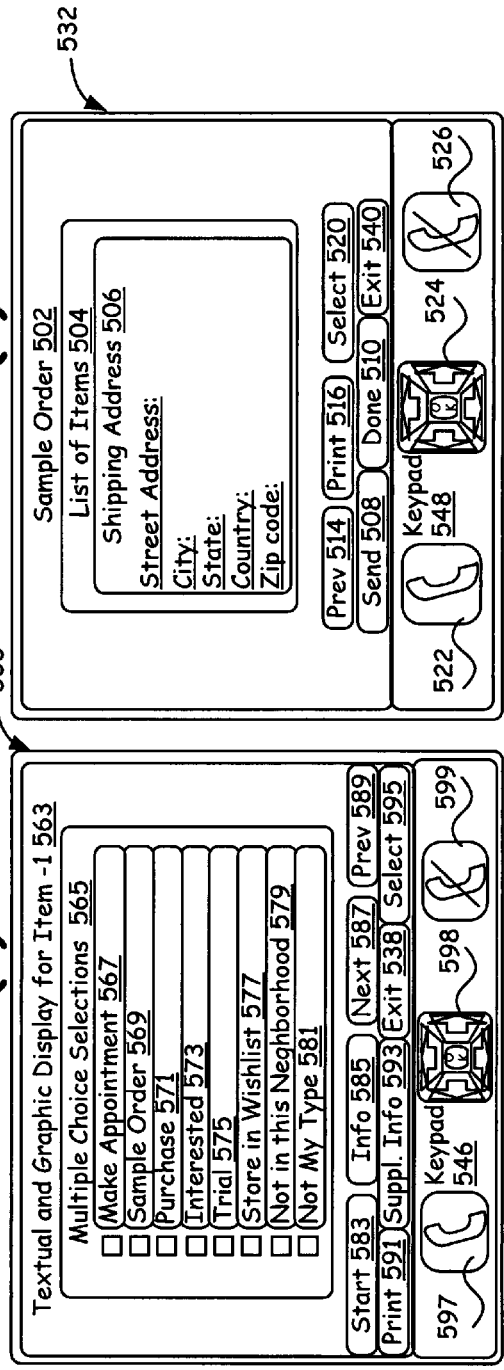

MEDIA DISTRIBUTION SERVER THAT PRESENTS INTERACTIVE MEDIA TO A MOBILE DEVICE

CROSS REFERENCES TO RELATED APPLICATIONS

The present patent application is a continuation-in-part of, claims priority to, and makes reference to U.S. non-provisional patent Ser. No. 11/821,771, entitled "SYSTEM FOR PROVIDING INTERACTIVE USER INTEREST SURVEY TO USER OF MOBILE DEVICE", filed on Jun. 25, 2007. The complete subject matter of the above-referenced United States Patent Application is hereby incorporated herein by reference, in its entirety.

This patent application makes reference to U.S. provisional patent, Ser. No. 60/860,700, entitled "AUDIO GUIDED SYSTEM FOR PROVIDING GUIDANCE TO USER OF MOBILE DEVICE ON MULTI-STEP ACTIVITIES", filed on Nov. 22, 2006,. The complete subject matter of the above-referenced United States Patent Application is hereby incorporated herein by reference, in its entirety.

This patent application makes reference to U.S. Provisional Patent Application Ser. No. 60/524,568, entitled "QUESTIONNAIRE NETWORK FOR MOBILE HANDSETS," filed on Nov. 24, 2003. The complete subject matter of the above-referenced United States Provisional Patent Application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States Patent Application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional Patent Application is hereby incorporated herein by reference, in its entirety.

BACKGROUND

1. Technical Field

The present invention relates generally to a server facilitating the delivery of interactive media to mobile devices and more particularly to a server that delivers interactive content as part of a customized service to a mobile device user.

2. Related Art

Current mobile device service networks do not provide easy to use services to users of mobile devices. They also have infrastructure that is rigid wherein it is not easy to create and deploy new solutions. However, the use of mobile devices has become ubiquitous and can be encountered in all walks of life. This is made possible due the wide coverage provided by wireless networks. Such a wireless network can be valuable but is underutilized due to lack of several key technologies, in addition to lack of standard interface and communication protocols. Mobile devices are typically used for voice calls and data access over wireless networks. However, there are very limited uses to which a typical user employs his mobile device, such as voice calls and email access.

Currently mobile devices do not support interactive media effectively. A micro browser available in some mobile devices makes it possible to enter a URL and retrieve a web page. Some Internet websites can be accessed using the browser in some mobile devices. Unfortunately, new forms of interactive media are not supported in most mobile devices—these include questionnaires, audio-assisted activities, etc.

Normally, advertisements are provided on televisions (TVs) and newspapers. Often they are not interactive in the sense that the user can view them but cannot do much with these forms of advertisements. Advertisements provided as video clips that are easy to run on television (TV) and computers have been known for a while. However, these are not communicated to mobile devices typically. Some rudimentary forms of advertisements, in the form of text based SMS messages have been recently available. Mobile devices are currently confined to such limited text based advertisements. Mobile devices with poor display resolution are not effective in presenting large forms of media. Ads in the form of movies and video clips, shown in movies and on TV are not possible on mobile devices due to technical as well as usability reasons.

Current media distribution servers have no control over the media once delivered to its clients. They often deliver some form of text or a webpage to a mobile device. Some media distribution servers provide songs for download. Others provide movies for download. Client devices run some small programs such a an MP3 player or a video player to receive the songs or movies and play them on the mobile device. A browser in a mobile device may have a plug-in for a MP3 player or a video plugin and may be able to play songs and movies when downloaded by a user who uses the browser.

Present media distribution servers are not customized to deliver interactive media on the mobile devices to provide uniform services across the entire mobile user community due to the wide difference in the mobile device hardware architecture. Thus the current media distribution server often cannot compensate for the inherent limitation of mobile device architecture. For example quite a few types of mass-market mobile devices cannot store large plug-ins and process movies and longtime video/audio clips (at the required display frame rate) unlike personnel or laptop computers. This is due to small storage, small system memory and relatively less powerful processing circuitry on the mobile devices. This requires a different approach to be accomplished by media distribution server in delivering image or audio/video clips on mobile devices. It also makes it necessary to develop new technologies for supporting interactive media on mobile devices.

Handheld devices like mobile phones have a small display that needs to be taken into account when developing new interactive media solutions and in designing new media distribution servers. Because displaying adequate text in the interactive media on such small displays is not possible to describe complex products or services. In this scenario a new method of interactive media delivery is imperative. In this context the current media distribution servers such as those that deliver songs and movies to a mobile device are not implemented to complement the dynamic requirements of media delivery based on the instantaneous inputs from different entities on the network.

The architecture of the mobile devices varies widely in terms their interface with the internet and its components such as servers, standard internet communication protocols, etc. The architecture of the mobile services do not fall strictly in the realm of any standards, and thus are more of proprietary in nature. Thus we see a wide range of mobile product in terms of their functionalities and capabilities. It becomes more challenging to deliver any interactive media on such a vast variety of architecturally differing mobile clients. Current media distribution servers are inadequate in providing the interactive media delivery services over such a nonstandard (in media types and content delivery means) and architecturally divergent mobile device base.

Currently media distribution server incapable of delivering new services such as those needed to conduct e-business. New types of e-business are likely to proliferate in the near future are likely to provide services to a user over a mobile device. Media distribution servers are inadequate in addressing the needs of such new e-businesses.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

FIG. 5(a)-(d) are exemplary screens on a mobile device displayed successively to a mobile user, the associated content being delivered by a media distribution server, the exemplary screens facilitating request for a product sample, a product trial, a purchase order for a product, etc;

DETAILED DESCRIPTION OF THE DRAWINGS

The number of mobile device users is growing day by day and the mobile device is becoming a very important personal device through which different kinds of information can be accessed by a user. An enterprise or a service provider, using the present invention, can provide interactive media to a mobile device user easily, when it is convenient to the user. Distributing interactive media to mobile devices makes the access of such information by mobile users more convenient, useful and timely. For example, it is possible to propagate information on new events and products, etc. In addition, employing the present invention, content and information associated with services provided by E-business (Electronic business) can be distributed to mobile device users, which adds a new dimension to access of data and services via a mobile device. A network involving the mobile devices is far more effective and efficient in distributing interactive media compared to Internet, which can only reach information to relatively small cross section of the people, especially in countries where Internet coverage or access is limited or expensive.

Figure 1:
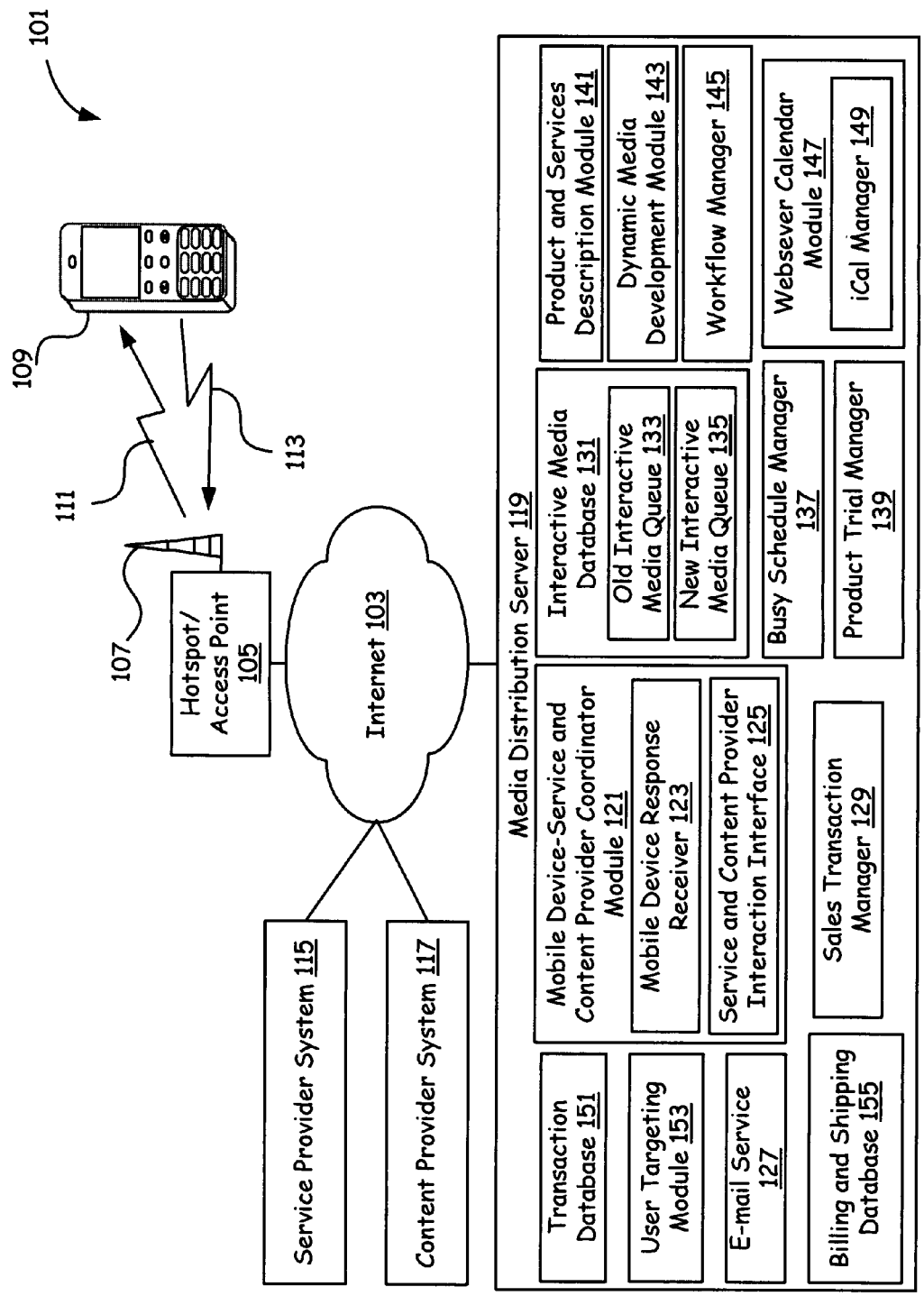
FIG. 1 is a perspective block diagram of the network containing a media distribution server, mobile device and service and content provider system, in accordance with the present invention.

FIG. 1 is a perspective block diagram of the network 101 containing a media distribution server, mobile device and service and content provider system, in accordance with the present invention is a perspective block diagram of the network 101 containing a media distribution server, mobile device and service and content provider system, in accordance with the present invention. Advancement in the web based technology have made distributing the interactive media over mobile devices 109 an attractive means of communicating the e-business interactions and contents to a user of a mobile device 109, in accordance with the present invention. Accordingly the interactive media that is to be distributed to the mobile device 109 can be preprocessed on a central server and then distributed to the mobiles device 109 in a more efficient manner. This approach helps in circumventing the issue of limited resources (storage, system memory, processor, etc.) on the mobile device 109.

In the present invention, the interactive media can be either pre-created by a service provider and distributed or generated dynamically to be customized and distributed. For example, the information required to generate the interactive media is gathered on the fly through interaction with service or content providers and could be influenced by information provided by the mobile device 109 user. The service and content providers share their product (or service) information with the media distribution server 119, and the mobile device 109 users respond to data provided which generates additional inputs from the user. For example, a mobile device user provides input by way of selecting from the multiple choices and options provided in the screens of a client application, such user input from the screens further guiding the media distribution server to generate and deliver additional (such as the next) interactive media screen, in accordance with the present invention.

In particular, the media distribution server 119 receives interactive media, such as questionnaires, interest indicator surveys, audio-assisted guided activities, adhoc questionnaires, etc. and inserts one or more advertisements into it, before delivery to one or more mobile users on their mobile device 109. In one related embodiment, the inserted advertisements are tailored to a user's profile and user's interests and recent purchases. In another embodiment, it is associated with or related to a product or service regarded as the subject matter of the interactive media, such as an advertisement for a network router that is determined to be related to a questionnaire on access points from a company in the network equipment industry. The media distribution server 119 also selectively provides metadata or configuration along with the interactive media delivered, that indicates to a mobile device 109 or to actually a client capable of displaying the interactive media the need to play an advertisement before, during or after the display of the interactive media.

Another important feature of the media distribution server 119, in accordance with the present invention, is the solicitation of a user response employing menu items presented or a multiple choice presented in the interactive media, and the interactions with external system based upon responses received. For example, the user of an interactive media is presented with a multiple choice selection that comprises "make and appointment" item, and when selected by a user, the media distribution server 119 acts upon the user response and communicates the user response to a service provider to trigger appointment generation. It also, if necessary, forwards an appointment information back to the user via the mobile device 109. Similarly, purchase requests made by a user by selecting a "make a purchase" multiple choice selection on the mobile device 109 is received by the media distribution server 119 and an interaction with an external system, such as the service provider system or a billing system is initiated, and optionally, an invoice is sent back to the mobile device 109 to solicit user review and user approval, often with the need for the user to enter a PIN code or a security code as part of the approval and user authentication process.

The media distribution server 119 comprises a module called product and service description module which is guided by the inputs furnished by the service or the content providers and the mobile device users to generate the next portion of interactive media or a new item (displayed on a screen of the mobile device 109) of interactive media on the mobile device 109 display. The selection made by the users are in the form of multiple choice and option buttons which is communicated to the media distribution server 119 which then, in response delivers a next interactive media (or the next portion of the current one) in a next screen with perhaps a next set of choices and options. Thus, a user of the mobile device 109 participates in the interaction to guide the interactive media generation using a joystick, softkeys, and the keyboard (limiting the use of the keyboard is one of the goals) as appropriate on his mobile device.

In one exemplary delivery of an interactive media to the mobile device 109, at the beginning, the media distribution server 119 presents a list of interactive media for display to the user of the mobile device 109 on a welcome screen. The user then selects one of the interactive media from the list using the joystick o the mobile device 109 or softkeys. In response to this user selection the media distribution server 119 presents the selected interactive media. Thus the user obtains an updated display with the new interactive media selected which comprises a corresponding new set of option buttons and multiple choices, etc. Then the user continues to guide the dynamic interactive media generation selecting a specific option button, in response to which the mobile device receives next option of the current interactive media or a new one altogether, and so on. Each of the screens presented to the user comprises come of the softkey (or button) selections: "start", "info", "suppl. (for supplementary) info", "next", "prev" (for previous), "print", "done", "exit", "forward", "select", etc. On any screen, as appropriate, the user can select the "exit" button to exit from the current interactive media taking the user back to the welcome screen on which interactive media list is presented again, or a "done" button to successfully finish an operation, or to quit and go back to the power-on screen.

The modules comprised by the media distribution server 119 facilitate all the functions necessary to promote e-business interactions and business information flows designed by the service providers. They make it possible for a service provider to interact with the mobile device 109 and provide e-business services (sometimes referred to as m-business services, which stands for mobile business services). They also enable a user of the mobile device to conduct mobile transactions with the service providers, such as request a service, request a specific content from a content provide, or to accomplish a particular task for e.g. an online purchase. The media distribution server 119 of present invention also comprises an interactive media database 131 and a transaction database 151 that support such transactions, business information flows and content distribution. The interactive media database 131 comprises all the new and old interactive media that are to be distributed and those that were already distributed in the past, respectively. The transaction database 151 comprises all the information relevant to the transactions that are completed. The transactions in that database comprise those items that are sold online, and also those items for which a trial product may be requested or a sample product may be delivered.

The product trial information managed by a product trail manager 139 comprises information such as a trial period, a start of trial, an end period of the trial, conditions stipulated for the trial period, etc. A billing and shipping database 155 comprises a billing address and a shipping address for mobile users, especially for those who have conducted sales transactions using their mobile devices 109. Furthermore, the billing and shipping database also contains information on whether the marketing company (service providers and content providers companies) has shipped the product to a buyer's contact address.

The media distribution server 119 of the present invention also comprises a user targeting module 153 and an E-mail service module 127. The user targeting module 153 gathers browsing interest and habit related history of mobile user which helps communicating relevant type of interactive media to him/her. The E-mail service module receives the E-mail address part of the user response when the contact details are furnished by the user and delivers E-mails on important transactions such as purchase, appointment, product trial details, licenses, acknowledgement, user confirmation, etc.

The "mobile device-service and content provider coordinator module" 121 (coordinator module in short) of the media distribution server 119 coordinates the exchange of messages and controls information flow between the mobile devices 119 and a service provider system 115 or a content provider systems 117. As the interaction between two entities (such as system, server, client device, etc.) take place in a handshake mode; it always proceeds with a response from one entity (say entity-1) in one direction to another entity (say entity-2). It coordinates delivery of a response by a recipient entity in the opposite direction( that is from entity-2 to entity-1) to accomplish an action, and a series of such action will constitute a task. For example, responses will be appropriately relayed or forwarded in either directions by the coordinator module 119.

A busy schedule manager 137 performs scheduling management, i.e. the exchange of message and control information regarding availability and scheduled tasks, between two entities on the network, such as by sensing the traffic conditions and information delivery expectations. The interaction between the media distribution server 119 and the mobile device 109 or the media distribution server 119 and the service 115 or the content provider system 117 sometimes requires a tracking and scheduling mechanism which is performed by the busy schedule manager 137.

A product trial manager 139 in the media distribution server 119 keeps track of the details of the sample/trial requests made by the mobile device 109 user. The product trial manager 139 assists by prompting a user, on behalf of (or as instructed) the service 115 or contents provider system 117 for a sample product delivery or a trial period establishment with accompanying product delivery. It also keeps track of the trial duration and user feedback during the trial period for further follow up actions.

A product and services description module 141 and a dynamic media development module 143 in the media distribution server 119 collaborate to generate the interactive media (or content in general) that is dynamically created and delivered to the mobile user. This collaboration occurs using the inputs provided by the mobile device users and the information provided by the service or the content providers. The product and the service description module 141 has a generic description of the interactive media that describes a product or a service that is accessed (or consumed) by the mobile device 109 user. In one embodiment, a generic form of interactive media is assembled/constructed and maintained in a library. The dynamic media development module 141 receives inputs from the mobile device users and the service or the content providers and customizes the generic interactive media, and subsequently delivers them to the mobile users. Furthermore, in a related embodiment, the dynamic media development module 141 queues up new interactive media into the "interactive media database" for the subsequent delivery to the mobile device.

A workflow manager 145 plays a role of setting up information flow as per a pre-defined work flow. It also establishes reporting tasks, billing tasks, backup and restore activities, communication links, as necessary. It receives inputs from different entities and responds appropriately. It prompts an entity (for e.g. a mobile device) with a query and receives its response, and (for example) as per a work flow, forwards it to a service provider system 115 or a content provider system 117.

In accordance with the present invention, the interactive media is an XML document comprising multiple items, wherein each of the multiple items comprises a text, graphics, audio segments, and or video clips. Each of the multiple items may comprise a multiple choice set that is displayed to a user to solicit user response. User response can also be in the form of a recorded message (digitally recorded by the mobile device 109). User responses collated by the mobile device 109, in selections from a multiple choice set for the multiple items, and/or in the form of audio response to those items is communicated by the mobile device 109 to the media distribution server 119.

In accordance with the present invention, in one embodiment, a tagged message in the a first piece of delivered code (say, in a web programming language) is communicated to the mobile device 109 and this first piece of code comprises a second piece of code, such as a script or a program, which selectively executes on the mobile device after it has been delivered. When this second piece of code runs on the mobile device, it collects some details of user interaction (and other associated information) and sends it back, as a response from the mobile device, to the media distribution server 119. In a related embodiment, the first piece of code is an XML based document comprising the interactive media and the second piece of code is an executable code that collects user responses and communicates it to the media distribution server 119.

Similarly, the media distribution server 119 also sends code in the interactive media along with control information or configuration information to the mobile device, gathers responses, and communicates them to the service provider system 115 or the content provider system 117.

In one embodiment, the media distribution server 119 also sends code along with responses to the service provider system 115 or the content provider system 117. The code that's sent by the media distribution server 119 running on the service or the content provider system 115, 117 collects all the interaction information and sends back to the media distribution server 119.

In one embodiment, the media distribution server 119 delivers code to the mobile device that determines what is displayed to the user (say within a current screen) and the multiple choice options presented. The response to the options selected by the user of the mobile device 109 (from the screen) flows back to the media distribution server 119 as control information which helps in preparing a next screen of information or in the assembly or generation of a new piece of code to be delivered next. For example, the code delivered to the mobile device 109 contains a message that will appear verbatim along with some tagged objects on the screen for e.g. text in the option button and the multiple choice selections. The user response subsequently collected from the mobile device 109 contains the control information which makes the media distribution server 119 perform a next task (decide on next course of action) for e.g. delivering additional code that ends up creating a next screen on the mobile device 109 that contains new information and user selectable options.

A webserver calendar module 147 facilitates processing of online appointment requests made by a mobile device 109 user and distribution of appointment information communicated by a service provider system 115 to the user of the mobile device 109. When a mobile device 109 user makes a request for an appointment with the media distribution server 119, the webserver calendar module 147 of the media distribution server 119 prompts the respective service provider system 115 or a content provider system 117 with an instance of iCal data (internet calendar application). The service or content provider systems 115, 117 then make entries in their calendar modules using the iCal data provided and sends it a confirmation back or an alternate iCal data back to the media distribution server 119. The media distribution server 119 forwards the confirmation information or the alternate iCal data it to the mobile device user who had made a request for an appointment. Based on this iCal data provided, which is stored in the mobile device, such as in a calendar client, the mobile user prepares for a meeting as per the entries made in the iCal by the respective service or content provider. The iCal data sent to the mobile device (or schedule information in other formats) is associated with a scheduled meeting, such a scheduled meeting being arranged to see a real estate property on sale, tryout a membership at a local fitness center, meet a broker for some investment advice, etc. It can also be a schedule for a telephonic conversation, a conference call, an e-mail exchange, a instant messaging chat, a meeting with an individual, a testing of a service or a content, a meeting with a service provider or a content provider's representative, etc.

The media distribution server 119 is communicatively coupled to the mobile device 109 and service 115 and content provider systems 117, in accordance with the present invention. The media distribution server 119 and the service provider system 115 are communicatively coupled, for example via the Internet 103. The content provider system 117 and the hotspot/access point 105 are also communicatively coupled with media distribution server 119 using the Internet 103. The mobile device 109 may employ a cellular service or a WLAN (or even a WiMAX) service to establish communications with the media distribution server 119, via the Internet 103.

The hotspot/access point 105 is further communicatively coupled with the mobile device 109. For example, it is communicatively coupled using the antenna 107, and the upward and downward wireless links 111 and 113 respectively. The hotspot/access point 105 is a WLAN access hotspot, such as those used for WiFi communications, in one embodiment and is a cellular network access point in another. In general, the hotspot/access point 105 is a wireless digital interface that delivers interactive media from the media distribution server 119 and collects the user's response from the mobile device 109.

The mobile device 109 has a joystick which aids navigation and scrolling, and softkeys which helps in selecting a menu item from a menu list or a media list displayed. It also selectively employs the joystick and the softkeys to enable user selection from multiple choices provided or form option buttons displayed on a screen displayed on the mobile device 109.

The service provider system 115 is a computer or a server through which service and product related ads and information are submitted to the media distribution server 119 via the Internet 103. The content provider system 117 is a computer through which the content providers deliver contents such as MP3 based songs, video clips, news and event related information, advertisements, to the media distribution server 119 so that the media distribution server 119 distributes them among a large community of mobile users.

In one embodiment, the media distribution server 119 inserts advertisements provided by a content provider system 117 into an interactive media, such as a questionnaire or a recipe provided by the service provider system 115, and delivers the combined interactive media (with its embedded or associated advertisement) to the mobile device 109.

The media distribution server 119 employs several databases which assist in gathering and maintaining all the media related interaction information. For example, it employs the transaction database 151, which maintains all the online transaction information such as purchases, product trial and the online appointment related information. It also employs the billing and the shipping database 155 that comprises all the billing and shipping details for the users and also maintains information on all the transaction conducted on the media distribution server 119.

The interactive media database 131 contains all the interactive media that have been distributed. In particular it stores a reference to older interactive media in a queue called old interactive media queue 133 and ones more recently generated, some of them yet to be communicated to the mobile device 109, referred to as new interactive media, in a separate queue referred to as the new interactive media queue 135.

The user targeting module 153 is a module which maintains the transaction history, interactive media access history and habits of an individual mobile device 109 user so that it can determine if the user makes a good target for the distribution of a new interactive media. The E-mail service 127 facilitates the retrieval of the E-mail address information from a user registration database or from a stored user profile and the communication of invoices, acknowledgements, additional information requested by a user, appointment information, etc. to the user employing an email address associated with the user. In particular, using the email address of the user, it communicates acknowledgements on every successful transaction conducted by the user using the mobile device 109, such acknowledgement and confirmation often originating at the service provider system 115 or the content provider system 117.

The coordinator module 121 has a role in coordinating interactions between the mobile device 109, and the service provider system 115 and the content provider system 117. The role of this module 121 is often closely coupled with the role or function of (i.e. the communication protocol set up by) the workflow manager 145. The mobile device response receiver component 123 of the coordinator module 121 receives the user provided response from the mobile device 109, such as multiple choice selections made by a user or an audio message recorded by the user, during the review of an interactive media by the user on the mobile device 109. User selections of items in a multiple choice selection can be made, for example, employing a joystick on the mobile device 109. or using the softkeys provided by the mobile device 109 on a screen displayed to the user. Such user response are, in some embodiments used as inputs in generating subsequent interactive media portions, or subsequent screens by the media distribution server 119. The service and content provider interaction interface 125 facilitates the interactions with external systems, such as the service provider system 115 or the content provider system 117, such interactions needed for the retrieval of the service provider's inputs and content provider's inputs. The inputs that are retrieved by the module 121 are provided as inputs to the dynamic media development module 143 which uses a generic media description tool, the product and services description module 141 that generates the interactive media using the inputs provided, to queue up a next portion of interactive media (or a new one) in the new interface media queue 135 of database 131, for subsequent delivery to the mobile device 109.

The sales transaction manager 129 conducts all the mobile sales transactions and maintains all the transaction related data that might be retrieved as a transaction report from the transaction database 151. The transaction report is periodically retrieved by a user of the media distribution server 119, such as a manager associated with a service provider or a content provider. The sales transaction manager 129 facilitates communication of an invoice to the mobile device 109 for approval by a user, and communication of sales confirmation by the media distribution server 109.

The busy schedule manager 137 helps in the successful delivery of the interactive media to the mobile device 109 as per a schedule of delivery. It also facilitates retrieval of a response from the mobile device 109 based on a schedule or based on current traffic conditions. For example, it does this task by tracking the traffic conditions on the network and deciding when it is appropriate to interact with the mobile device 109. Proper timing is very essential. When a user triggers a button on a screen on him mobile device 109 resulting in a response being communicated to the media distribution server 119, the media distribution server has to respond back to the user fairly quickly in time—otherwise the interaction is likely to be perceived as tedious by the mobile user. Shorter the delay in responding to a user initiated interaction, the more satisfactory is the user's experience is likely to be.

The product trial manager 139 responds to all trial requests made by the users. It facilitates a follow up and maintains information such as the trial duration, trial conditions, etc. and communicates such information to both the mobile device user and the corresponding service 115 and the content provider systems 117. The service 115 and the content provider system 117 then make arrangements for the sample product to be shipped to the user's contact address. If it is a software product for which a trail is requested by a user, the trial period for the software is setup automatically by the product trial manager 139 with associated start and end durations determined, such as a period based on the date a mobile user makes the request.

The workflow manager 145 sets up a communication link with a predefined type of interaction that take place among various entities i.e. between a mobile device 109 and the media distribution server 119; or between the media distribution server 119 and the service or the content provider systems 115 and 117 respectively. Workflow is basically the exchange of data, instructions, control information, and messages, in a specific order or at specific times among the entities to accomplish a specific task, for e.g. an online purchase.

The webserver calendar module 147 fields appointment request by a user and sets up an appointment as requested by the mobile device user. For example, when the mobile device user makes an appointment request by selecting the "appointment" multiple choice selection on a displayed item (or activates a button on his screen, the request is sent to the media distribution server 119. In response to this, the server 119 invokes an iCal manager 149 that is a component in the webserver calendar module 147, which creates a schedule or a calendar entry which is communicated to the mobile device 109 as an iCal instance (in iCal format, for example). If, for a particular service, a service provider system 115 is responsible for making appointments, then the webserver calendar module 147 requests the service provider system 115 to generate an appointment. It provides the service provider system 115 details of the mobile user (such as a user profile) and the specific item(s) of the corresponding interactive media (such as real estate properties of interest) for which the user has requested an appointment. Thus, the mobile user is sent an instance of iCal (internet calendar) by the respective service or the content provider systems 115, 117, or by the media distribution server 119, after they have created relevant appointment entries. The server 119, for example, forwards the iCal instance with the entries for an appointment to the mobile device user, that may be displayed to the user on the mobile device 109 in an appropriate screen, enabling the user to prepare/plan for a meeting with a representative of the service provider or the content provider. For example, the appointment can be for a telephonic conversation, a call conference, an E-mail chat, or a meeting in person with the representatives of the service or the content providers.

In one embodiment, a client in the mobile device 109 makes it possible to download and display interactive media from the media distribution server 119 whenever the user so desires. It also receives notifications from the media distribution server 119 regarding the availability of new interactive media. In a related embodiment, it gets interactive media and other content pushed to it from the media distribution server 119. In particular, it gets recipes from the media distribution server 119 and displays it to the user. The recipes are audio-assisted recipes with step-by-step audio instructions for the various steps of the recipe. These steps are enhanced with graphic aids and textual descriptions of the steps and the ingredients used in those steps. Each recipe also comes with a list of ingredients that can be viewed by activating an "Info" softkey or button on the screens. In addition, these recipes can be selectively saved in the mobile device 109. The audio instructions are typically provided by a chef or a famous celebrity whose achievements and recipes the user of the mobile device is keen on following (as a fan or a subscriber). The graphic aid for each step can be graphics (digital image or a photo graph, for example) of a utensil, an appliance relevant to the recipe, of ingredients used, etc. In addition, a graphical image of the chef (or the celebrity associated with the recipe) is also displayed, such as in a corner of the screen. In another related embodiment, the recipes are video-assisted recipes (providing video clips with audio accompaniment) with step-by-step video instructions for the various steps of the recipe. Textual descriptions of the text are also provided and supplementary information provided comprising the various ingredients, utensils, dinner placements and appliances.

In one embodiment, the media distribution server 119 assembles one or more textual, graphics, audio, video and multiple choice content into a delivered interactive media, that has been delivered by a service provider system or a content provider system, creating an assembled interactive media. It also incorporates one or more advertisements into the assembled interactive media creating a new/customized interactive media that can be delivered to a user of the mobile device 109.

In one embodiment, the mobile device 109 presents a list of available interactive media to a user of the mobile device and solicits a user selection. It then retrieves a selected interactive media based on the user selection, wherein the selected interactive media comprises an inserted advertisement and an "other content". For example, the other content comprises one or more portions of an interactive media, with each portion comprising a textual component, a graphics component, an audio component and an optional video component, etc. The mobile device 109 displays the inserted advertisement provided in the interactive media. It also displays the other content. It can display, based upon a configuration provided in the other content, or in the advertisement portion, or even as metadata, the advertisement before, during or after the display of the other content. Thus, the mobile device 109 displays the inserted advertisement before, after or during the display of the other content based on such configuration information.

Figure 2:
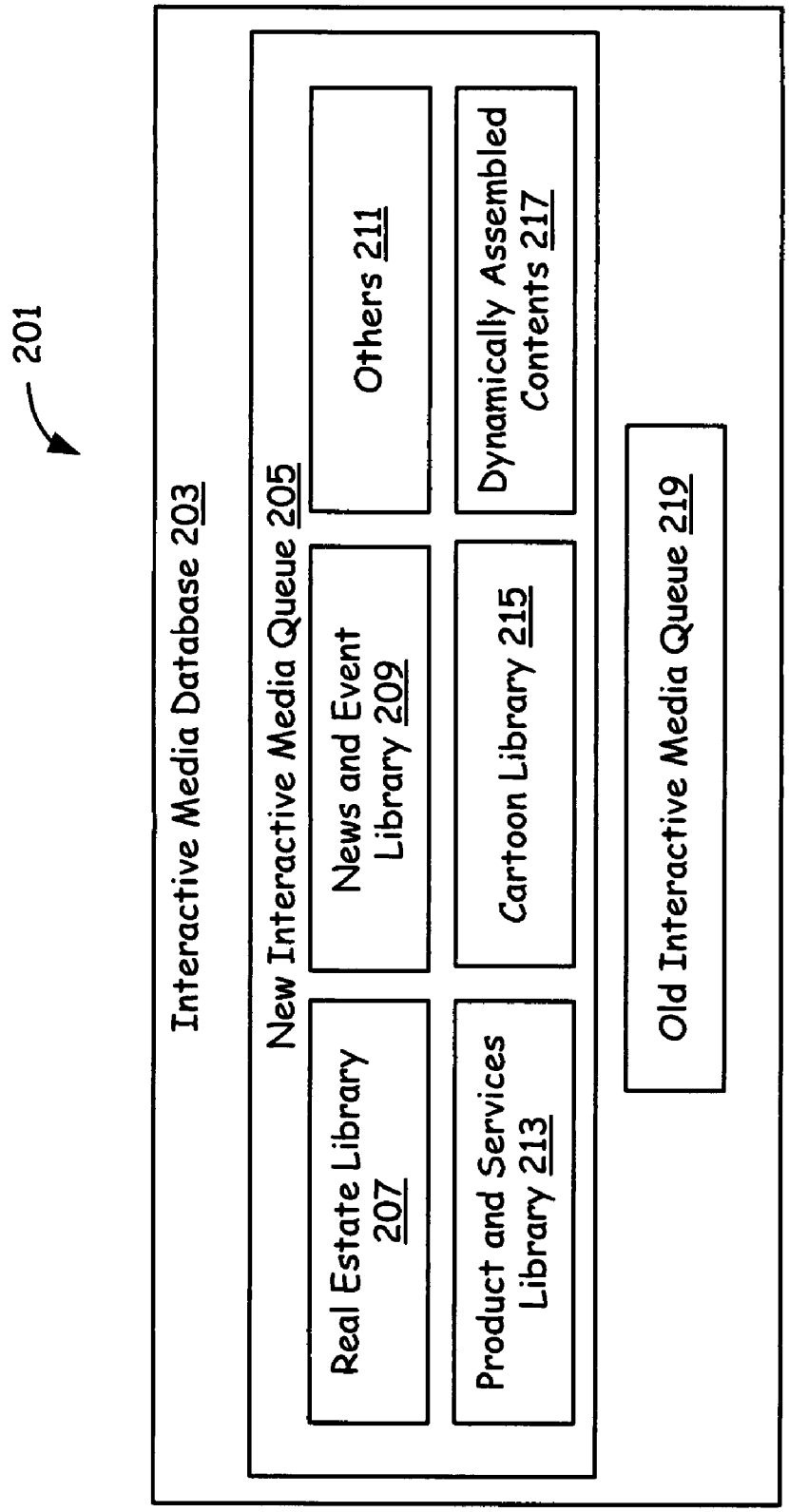
FIG. 2 is a block diagram of an interactive media database in accordance with the present invention.

FIG. 2 is a block diagram of an interactive media database 201 in accordance with the present invention is a block diagram of an interactive media database 201 in accordance with the present invention. The product and the services description module 141 of FIG. 1 is a perspective block diagram of the network 101 containing a media distribution server, mobile device and service and content provider system, in accordance with the present invention provides the generic content that can be customized before delivery to a user of a mobile device. A generic content for a product or service may comprise of one or more portions (one or more types of data, for example), that it typically receives from a service provider system 115 or a content provider system 117. Some of these portions may be changed, swapped added or dropped based on preferences, mobile device configuration, mobile device capabilities or customization needs, before it is delivered to the mobile device 109. Thus, customized interactive media can be generated dynamical and delivered to a user of the mobile device 109. In one embodiment, the interactive media are organized in the form of different libraries in the interactive media database 203. Interactive media libraries are categorized based on the nature of online sales and business an E-business company does on the internet.

More common categories of the interactive media libraries are real estate library, product and services library, news and the events library, cartoon library, dynamically assembled contents and other general category of library. Dynamically assembled contents are the interactive media generated based on the dynamic content assembly rules or dynamic assembly of interactive media based on parameters or inputs received from different entities. The inputs resulting in the dynamic interactive media are typically retrieved from the mobile user during his interaction with the mobile device 109.

In one embodiment, the interactive media database 203 comprises two main queues, one consisting all the new interactive media which are yet to delivered to the mobile devices (such as mobile device 109) and the other consisting of all the old interactive media that have been already delivered to the mobile devices. The new interactive media queue 205 has categorized libraries such as real estate library 207, product and services library 213, news and events library 209, cartoon library 215, other types interactive media library 211, and dynamically assembled contents interactive media library 217. The old interactive media queue 219 has all the old interactive media that have already been delivered to the mobile devices but still maintained for the later reference.

The real estate library 207 contains all the interactive media related to the real estate sales and property management business. When interactive media for real estate information is presented to a mobile user on his mobile device 109, the user is provided an opportunity to request an appointment. For example, a radio button labeled "make an appointment" is provided, which when clicked communicates a request by the mobile users to setup an appointment. The workflow manager 145 of FIG. 1 is a perspective block diagram of the network 101 containing a media distribution server, mobile device and service and content provider system, in accordance with the present invention sets up an appointment generation and schedule communication task(s) that processes appointment request from the user and facilitates setting up of an appointment to see a property advertised (for sale or rental) or meet an individual associated with a service provider.

The interactive media database 203 comprises all the interactive media that are referred to or described by the product and services description module 141 of FIG. 1 is a perspective block diagram of the network 101 containing a media distribution server, mobile device and service and content provider system, in accordance with the present invention based on content and configuration received from the service provider system 115 or content provider system 117.

The product and services library 213 contains all the interactive media related to the products to and services provided by mobile businesses /companies. The product information based interactive media comprise of a list of products and services wherein each item in the list can be viewed by the user, one at a time, when the interactive media is delivered to the user on his mobile device 109.

The news and event library 209 comprises all the interactive media provided by news organizations and online news publishing systems, that serve as content providers 117 on the network 101. This library comprises content that are basically news in brief, hat can be dynamically assembled into interactive media of interest to the user. In addition, they can incorporate different kinds of events, wherein the details of the events are short messages on public/private events of interest to a user.

A cartoon library 215 contains all the interactive media related to the cartoon art and animated video clips etc. as entertainment online. An others category library 211 contains all the miscellaneous interactive media. The dynamically assembled contents are the interactive media which are modified and delivered on-the-fly, processing responses and sometimes incorporating instantaneous inputs from the mobile device users.

Figure 3:
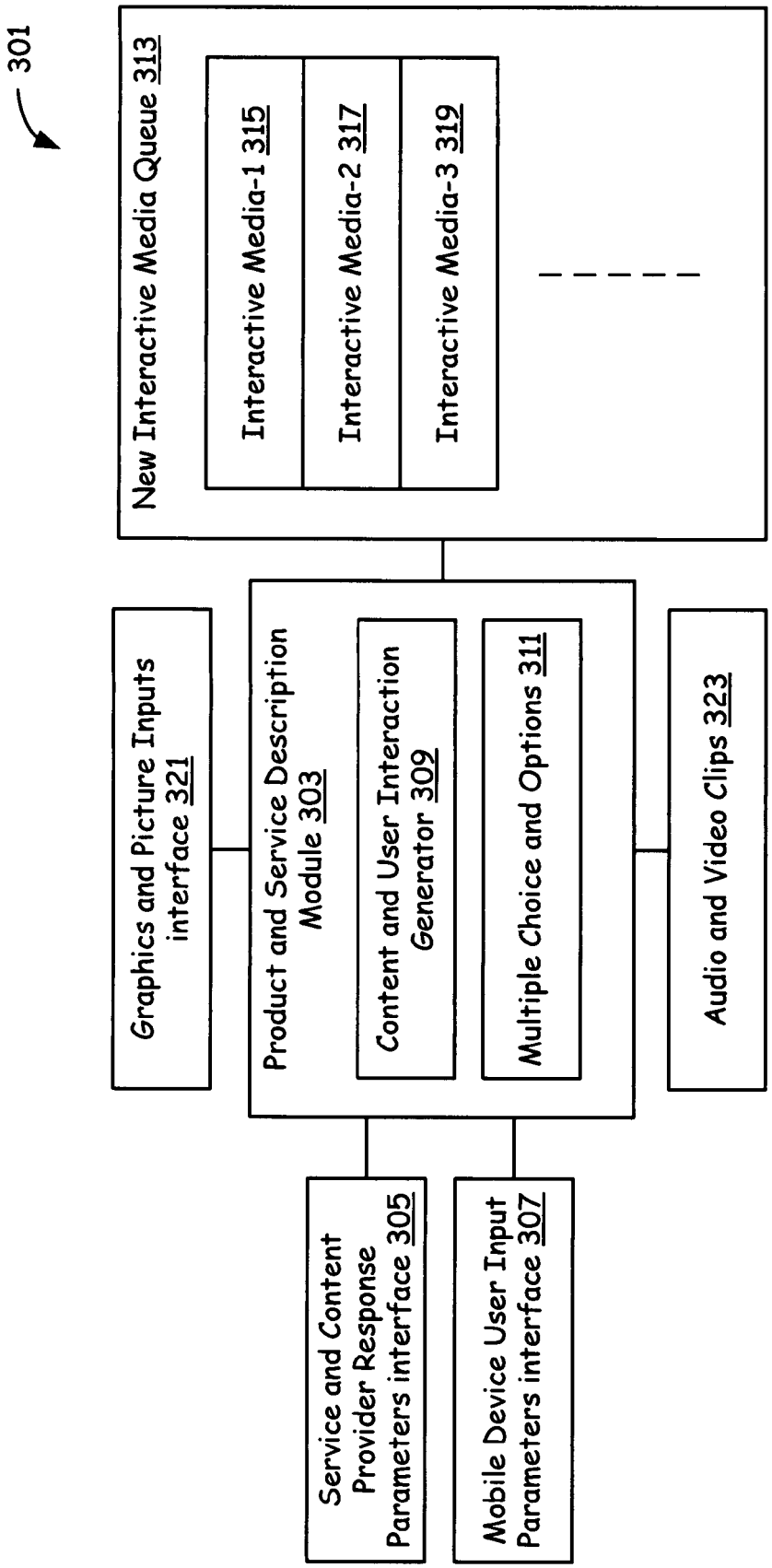
FIG. 3 is a perspective block diagram of a product and service description module, in accordance with the present invention.

FIG. 3 is a perspective block diagram of a product and service description module, in accordance with the present invention. This module has generic description of all the interactive media provided as an outline structure or a template with parameterized components/portions. The parameterized components/portions takes inputs assigned to the parameterized values resulting in specific instance of interactive media. The inputs provided are sometimes numbers or sometimes in other nonnumeric form. In one embodiment, the nonnumeric form of inputs are the type descriptions, mode of business transactions, product names, product models, product pictures or images, multiple choice selection inputs by the mobile users, etc., that are assigned as values to their respective parameters. These numeric and nonnumeric inputs incorporated into a template or a generic media description completely describe an instance of interactive media that can be delivered to a mobile device.

Subsequent interactive inputs provided by both the mobile device user and service or content providers further guide dynamic generation of interactive media. This can be used to convert a generic mobile/online transaction into a specific type of task e.g. purchase of a product, appointment request, setting up a trial of a sample product, terminating a transaction (exit), etc. For example, if an online purchase is conducted by the user, dynamic media description module translates the interaction into a financial transactions incorporating data such as billing, payment, service charge settlement, etc. into a specific task. For example, thus task is used for transactions related to purchase of a specific product by a user, with specific predefined sequence of inputs provided.

After the complete generation of the interactive media based on templates and inputs, it is inserted into an interactive media queue called new interactive media queue. The media distribution server 119 of FIG. 1 is a perspective block diagram of the network 101 containing a media distribution server, mobile device and service and content provider system, in accordance with the present invention distributes it to all the mobile devices. Once an interactive media is delivered to the relevant mobile devices, it will be moved to an old interactive media queue after some specific time as a backup. This backup is for later reference.

FIG. 3 is a perspective block diagram of various exemplary server-side components that are involved in the process of generating interactive media dynamically in a distribution server. A product and service description module 303 (141 of FIG. 1 is a perspective block diagram of the network 101 containing a media distribution server, mobile device and service and content provider system, in accordance with the present invention repeated) contains all the interactive media description in their template form. It comprises a content and user interaction generator component 309 which receives the inputs from an external content provider system (117 of FIG. 1 is a perspective block diagram of the network 101 containing a media distribution server, mobile device and service and content provider system, in accordance with the present invention repeated) and a mobile device user (109 of FIG. 1 is a perspective block diagram of the network 101 containing a media distribution server, mobile device and service and content provider system, in accordance with the present invention repeated) as it generates interactive media specific to the user based on the contents available/accessible. A multiple choice and options component 311 receives responses/selections from multiple choice selections made by the users. Multiple choices are various selections made by the users when presented with multiple-choice selections, radio buttons, etc. The choices are typically those made by the users before proceeding to any mobile/online transactions. The exemplary multiple choices according to the present invention are "purchase", "not interested", "interested", and "store in wishlist". Other types of multiple-choice selections presented to a user are also contemplated. For example, if the interactive media relates to a realty business the multiple choices will be of the type "make an appointment", "not interested", "interested", "not in this neighborhood", and "not my type". Thus, these choices presented to a user are likely to be vertical market specific too. In addition, user selections of screen navigation options, which are typically the controls selected on the mobile device screen, such as "next", "prev.", "forward", etc. are also supported. These navigation options further influence the dynamic assembly/generation of interactive media that are relevant to a user.

Additional inputs for a complete description of the interactive media are accessed from service and the content provider parameter interface 305 (115 and 117 of FIG. 1 is a perspective block diagram of the network 101 containing a media distribution server, mobile device and service and content provider system, in accordance with the present invention repeated), and a mobile device user input parameters interface module 307 that provides interactive inputs received from the mobile device users (109 of FIG. 1 is a perspective block diagram of the network 101 containing a media distribution server, mobile device and service and content provider system, in accordance with the present invention repeated). Images /pictures and graphics inputs are retrieved from the respective service and content providers employing a graphics and picture inputs interface 321. Also some generic pictures and images are picked as inputs from an internal image and picture library provided by the graphics and picture inputs interface 321. Other type of inputs to module 303 are audio and video clips 323 which are highly efficient means of providing interactive media to the mobile devices, in accordance with the present invention.

Completely described and defined interactive media, that are based on templates and dynamically assembled, are queued up in a queue called the new interactive media queue 313 (135 of FIG. 1 is a perspective block diagram of the network 101 containing a media distribution server, mobile device and service and content provider system, in accordance with the present invention repeated) for the subsequent delivery on the mobile devices 109 of FIG. 1 is a perspective block diagram of the network 101 containing a media distribution server, mobile device and service and content provider system, in accordance with the present invention. The new interactive media queue 313 is like a stack of items or objects that operate according to a distribution scheme, such as a first in first out scheme. This means that an interactive media which is stacked first into the new interactive media queue 313 will be delivered first to the mobile devices 109 of FIG. 1 is a perspective block diagram of the network 101 containing a media distribution server, mobile device and service and content provider system, in accordance with the present invention. The interactive media such as interactive media-1 315, interactive media-2 317, interactive media-3 319, etc. in the new interactive media queue 313 will remain active for a specified duration of time and will be removed after that and taken to a backup called old interactive media queue 133 of FIG. 1 is a perspective block diagram of the network 101 containing a media distribution server, mobile device and service and content provider system, in accordance with the present invention for later reference.

Figure 4:
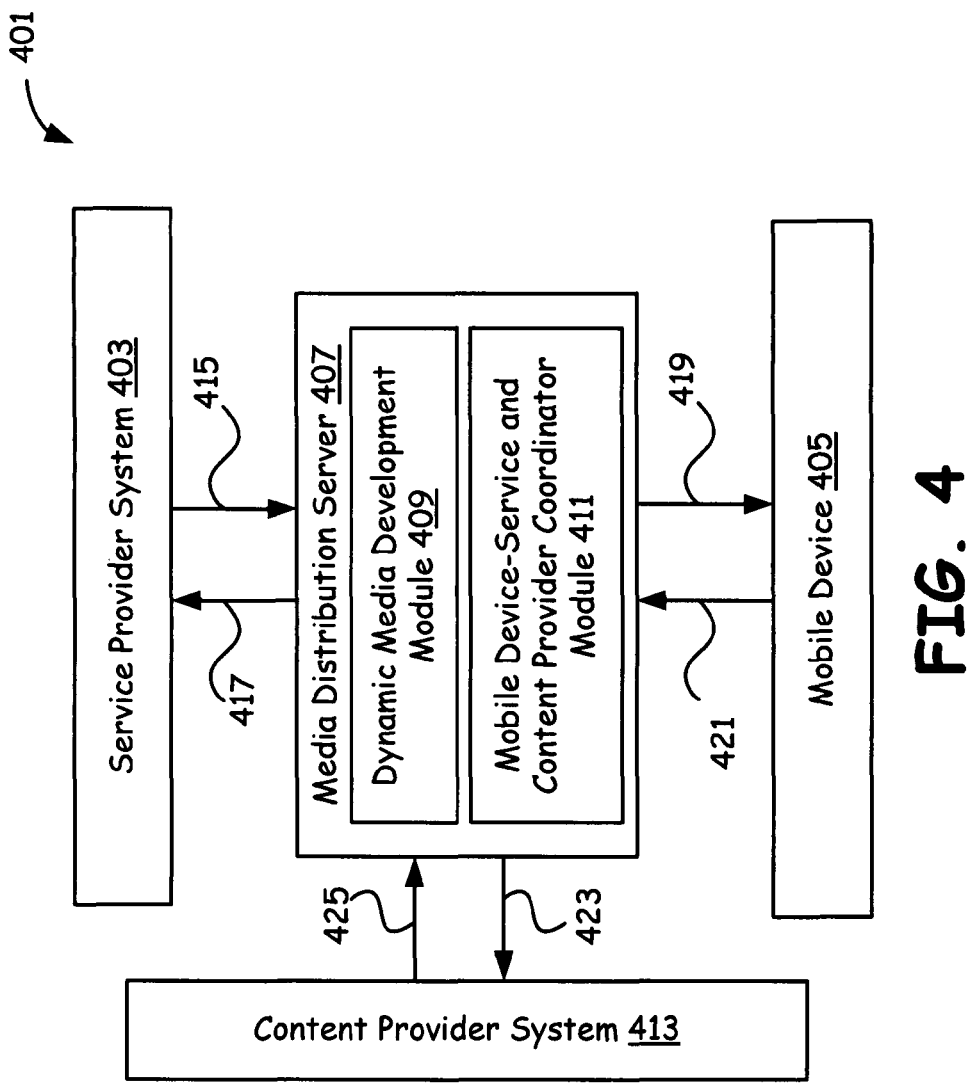
FIG. 4 is a block diagram of a network that operates a media distribution server that interacts with a service provider system, a content provider system and a mobile device in accordance with the present invention.

FIG. 4 is a block diagram of a network 401 that operates a media distribution server 401 that interacts with a service provider system 403, a content provider system 413 and a mobile device 405 in accordance with the present invention. The media distribution server 407 assembles and generates the interactive media using various inputs from the other entities and accomplishes the task with a two-way communication with those entities. For example, it receives commands (instructions, control information, messages, etc.) from an entity and generates messages for that entity to accomplish a task. The user generated interaction signals are typically provided from mobile display screens made available on the mobile device 405, such as by the user choosing multiple choices presented, or selecting on option buttons using the softkeys on his/her mobile device.

The interaction between a mobile device 405 and the media distribution server 407 typically start with the media distribution server 407 delivering a list of available interactive media to the mobile device 405. The mobile user using the mobile device 405 initiates subsequent interaction with the media distribution server 407 by selecting a suitable choice from his/her screen which results in a response message (shown by an inward arrow) towards the media distribution server 407. In response to this user selections/choices the media distribution sever 407 prepares new multimedia/interactive media content (to be presented in subsequent screens based on the options selected) and communicates back such content (shown by an outward arrow) towards the mobile device 405. Further selections made by the user on the subsequent mobile screens will result in a similar response from the media distribution server 407. Such interactions are continued until a predefined task is completed. Also the task maybe terminated by selecting an "exit" or a "done" button from the screen on the mobile device 405 at any time.

In some embodiment, the interactive media delivery process is initiated with the request made by a service provider or a content provider interacting (online or through some other means) the media distribution server 407 (administration) for marketing products or services, or for some business assistance such as for placements of an ad (or advertisement). In this process, the service or the content providers, employing the respective service provider system 403 or the content provider system 413, share their product and the service details (generally electronically online) with the media distribution server 407 (in a predefined format). This information forms the basic required input for the product and services description module 141 of FIG. 1 is a perspective block diagram of the network 101 containing a media distribution server, mobile device and service and content provider system, in accordance with the present invention. Using this initially shared information, the product and services description module 141 generates the interactive media and puts it in a queue to be delivered to the mobile devices 405.

The display screens for the interactive media on the mobile device 405 are data driven, and are facilitated by a client component. Being data driven, they undergo further modifications as dynamic data/content is assembled and delivered to the mobile device 405 by the media development module 409 based on interactive inputs from the mobile devices, in accordance the present invention. And subsequently a continued participation of mobile user in interaction process successfully accomplishes the objective (business or service) task. In this continued interaction between the mobile device user and the media distribution server 407, the service or the content providers are also involved through user requests forwarded to them or solicitations for more information forwarded to them by the media distribution server 407.

The block diagram 401 of FIG. 4 shows the two-way interaction among various entities that are involved in the delivery of the interactive media to the mobile devices. The media distribution server 407 (119 of FIG. 1 is a perspective block diagram of the network 101 containing a media distribution server, mobile device and service and content provider system, in accordance with the present invention repeated) has its essential components shown such as the dynamic media development module 409 (143 of FIG. 1 is a perspective block diagram of the network 101 containing a media distribution server, mobile device and service and content provider system, in accordance with the present invention repeated), and mobile device-service and content provider coordinator module 411 (121 of FIG. 1 is a perspective block diagram of the network 101 containing a media distribution server, mobile device and service and content provider system, in accordance with the present invention repeated). The media distribution server 407 is communicatively coupled with the mobile device 405 to accomplish the two-way viz. the upward 419 and downward 421 interactions respectively.

For initially providing content and associated meta information, and for subsequently providing additional content in the middle of a user interaction process, the service provider system 403 (115 of FIG. 1 is a perspective block diagram of the network 101 containing a media distribution server, mobile device and service and content provider system, in accordance with the present invention repeated) employs a two-way communication viz. the upward link 417 (from media distribution server) and the downward link 415, respectively. Similarly for a media or content propagation using the mobile devices, the content provider system 413 (117 of FIG. 1 is a perspective block diagram of the network 101 containing a media distribution server, mobile device and service and content provider system, in accordance with the present invention repeated) also employs a two-way interaction viz. upward link 423 and the downward link 425 respectively with the media distribution server 407. The upward and the downward communication protocols are set up using the workflow manager 145 of FIG. 1 is a perspective block diagram of the network 101 containing a media distribution server, mobile device and service and content provider system, in accordance with the present invention. These protocols are predefined for all the possible interactions during interactive media delivery.

FIG. 5 (a)-(d) are exemplary screens on a mobile device displayed successively to a mobile user, the associated content being delivered by a media distribution server, the exemplary screens facilitating request for a product sample, a product trial, a purchase order for a product, etc. Some of the screens presented to the user comprise an interactive media list from which a user can select an interactive media, wherein each interactive media comprises an associated welcome screen, text and graphics in different screens, and user selectable menu items, in accordance with the present invention. Due to small display on most mobile devices, it is not appropriate to present interactive media with lot of textual descriptions. This necessitates different forms of presenting interactive media on the mobile devices, and the present invention facilitates audio-assisted and video assisted interactive media.

In order to avoid cluttering the screen on the mobile device, descriptive audio and/or video clips provided with most of the interactive media are delivered to the mobile device and rendered/played, in accordance with the present invention. Audio guided interactive media have the advantage of being localized to the locale/language of the mobile user, as the mobile user can listen to media description in a language of his choice. In another embodiment of the present inventions video clips are associated with the interactive media to augment the corresponding product/service descriptions (which may have text and graphics too) more effectively.

In one embodiment, the computational resource limitation on the mobile devices is circumvented by an interactive screen generation facility supported by the media distribution server 119 of FIG. 1 is a perspective block diagram of the network 101 containing a media distribution server, mobile device and service and content provider system, in accordance with the present invention. Every screenful of information is retrieved from a portion of interactive media delivered to the device. The interactive media is assembled or generated by the media distribution server, in portions based on previous user selections and preferences, and then delivered to the mobile device. For example, in the display of one exemplary interactive media, the first screen is the "Welcome" screen containing the list of all the interactive media. The users start interaction by selecting a particular interactive media of his choice from the welcome screen, in response to which another screen containing various options on that particular product or service will be delivered by the media distribution server to the mobile device. Subsequent screens deliver portions of the particular interactive media selected by the user, the portions being based on the user's choice or options made on the current screen using his/her mobile device softkeys.

Exemplary screens 528, 501, 530, and 532 of FIG. 5 (a)-(d) respectively depict successive displays provided to the mobile device of the user, wherein the user is able to select one of a list of interactive media, the list delivered to the mobile device by the media distribution server. The list, in a related embodiment, is provided by the media distribution server in response to an user's request for interactive media.

The mobile device display screen 528 of FIG. 5(a) is a welcome screen for a client component that facilitates viewing of interactive media. The welcome screen often plays a jingle, provides a "splash" screen, prompts users to login selectively, and makes it possible for a user to select interactive media that can be delivered by the media distribution server to the mobile device. It provides a category list for interactive media list 513. The exemplary categories are products and services, Real estate, news and events, cartoons, etc. Each of these categories comprise interactive media of respective type which a user can select using softkey on the mobile keypad of the mobile device.

The option softkey buttons on the mobile device display screen 528 are the Start button 515, Info button 517, Next button 519, Done button 521, Print button 523, Suppl. (supplementary) Info button 525, Exit button 534, and Select button 527. A user selects various soft buttons using the softkey 531 from the keypad 542. In FIG. 5(a) the mobile device has the screen area and the keypad 542, which contains various keys including the joystick 531, a call connect key 529 (also used as softkey for menu item selection) and a call disconnect key 533 (also used as softkey for menu item selection). In one embodiment, the buttons (515, 517, 519, 521, 523, 525, 534 and 527) are replaced by corresponding menu items selectable using the softkeys 529, 533 and the joystick 531.

FIG. 5b is an exemplary display screen 501 of the mobile device that is displayed when a user selects product and services category 505 in the display for FIG. 5a. For example, a user can select the product and services category for relates interactive media items using the select button 527 (or a menu item) after optionally browsing up and down the list using the joystick 531. In response, the mobile device displays a list of items 537 comprising references to products and services. A user can highlight one or more of them using the joystick 559, and selecting them using the appropriate key such as 557. A keypad 544 contains various keys and the joystick 559. For example a call connect key 557 and a call disconnect key 561 can be used as softkeys with the functions of selection and cancel assigned to them.

The list of items 537 comprises a list of product and services items 539, 541, etc. The option buttons (which are provided as selectable menu items in a different embodiment) on this screen are a Start button 543, an Info button 545, a Next button 547, a Prev (previous) button 549, a Print button 551, a Forward button 553, an Exit button 536 and a Select button 555. Use of other buttons are also contemplated. An user selects various menu items or buttons using the joystick 559 from the keypad 544 and associated softkeys 557, 561.

The exemplary mobile device screen 530 of FIG. 5(c) is the screen displayed when the user selects one of a list of products and services displayed to the user on the mobile device. For example, from the screen displayed in FIG. 5(b) comprising a list of product and services, the user can select one of them and, in response, the screen 530 is displayed. The screen 530 comprises a textual and graphic display section 563 and a multiple choice display section 565. The location, relative positions, size and other characteristics of these two sections are configurable, and changeable. The mobile device also provides a keypad 546 which contains various keys such as the softkey 598, a call connect key 597 and a call disconnect key 599.

The textual and graphic display section 563 on the exemplary screen 530 of the mobile device displays information on the product and service item-1 selected in the screen of FIG. 5b. The associated multiple choices displayed are Make Appointment 567, Sample Order 569, Purchase Order 571, Interested 573, Trial 575, Store in wishlist 577, Not in this Neighborhood 579, and Not my Type 581 options. Other sets of multiple choice selections can be supported. Both exclusive and multiple selections are supported.

The exemplary option buttons displayed on this screen are a Start button 583, an Info button 585, a Next button 587, a Prev (previous) button 589, a Print button 591, a Suppl. Info button 593, an Exit button 538 and a Select button 595. A user selects various soft buttons using the softkey 597, 599 provided or the joystick 598.

In the exemplary screen shown in FIG. 5c, if the user were interested in requesting a sample or in ordering deliver of a sample(such as a free sample of a product), the user would highlight the menu item entry or button Sample Order 569 (if a the menu list is displayed, the appropriate item in the menu list can be selected). Such selections is made for the item, such as sample order 569, using the select button 595 (for example). In response to this the media distribution server 119 generates and delivers a next portion of the interactive media, as necessary, which would be displayed in an exemplary mobile device display screen of FIG. 5(d).

The exemplary mobile device screen 532 of FIG. 5(d) provides details of a sample order 502 requested by a user. For example, if the user selects the menu item Sample Order 569 displayed in FIG. 5c, the details of the sample order are presented to the user in screen 532, wherein the user is prompted to provide a shipping address 506 and other related information. In FIG. 5(d) the mobile device presents the sample order screen section 502 and a list of items section 504. Using a keypad 548 which contains various keys along with a joystick 524 a call connect key 522 and a call disconnect key 526, the user can enter the prompted data and interact with the screen.

In one embodiment, the screen for sample order requests 502 comprises a section "List of Items" 504 that makes it possible for a user to provide a shipping address information 506 comprising a label street address, city, state, country, and zip code. The mobile device user enters those items and selects the "Send" option button (or alternatively, a menu item) to deliver this information to a remote media distribution server, in accordance with the present invention.

The user selects the Send button 508 using the softkey 524 (for example) from the keypad 548 to proceed to communicate the shipping address to the media distribution server, such as the media distribution server 119 of FIG. 1 is a perspective block diagram of the network 101 containing a media distribution server, mobile device and service and content provider system, in accordance with the present invention. The media distribution server in response forwards this information to a corresponding service provider system. The service provider system arranges the delivery of a sample to the user. The sample is delivered employing the furnished shipping address. After sending the shipping address in the screen 532, user selects the Exit button 540 to return to the Welcome screen 503 of FIG. 5(a). In addition, the user can also select a Done button 510 to return to the power-on screen.

In general, the selection of the Start button enables the interaction on any screen. The selection of Info button furnishes the information on the selected item, such information provided in audio/voice form to the user. If the Suppl. Info button is activated by a user, additional information on the selected item, (such as a product or service) is provided, such supplementary information comprising information provided, as necessary, in textual, graphics and audio formats. For example, the supplementary information provided can be a combination of a textual description of a product or service, that is also accompanied by an audio description (such a human voice describing the product or service). In some cases video clips describing the selected item in more detail is provided.

In general, the Next and Prev buttons are used for the navigation purpose from screen to screen. The Done button takes is used to exit the use of the client application, thereby taking the user to a main screen, such as a power-on screen. The select button typically selects an item that is currently highlighted in a list presented to a user. The print button helps to print the current screen content on a printer, for example, employing a Bluetooth communication means. The Send button sends the current screen content, which the user has entered, for example, back to the media distribution server or to some other server, as relevant. The Forward button forwards an interactive media to another mobile device, or to another user.

Figure 6:
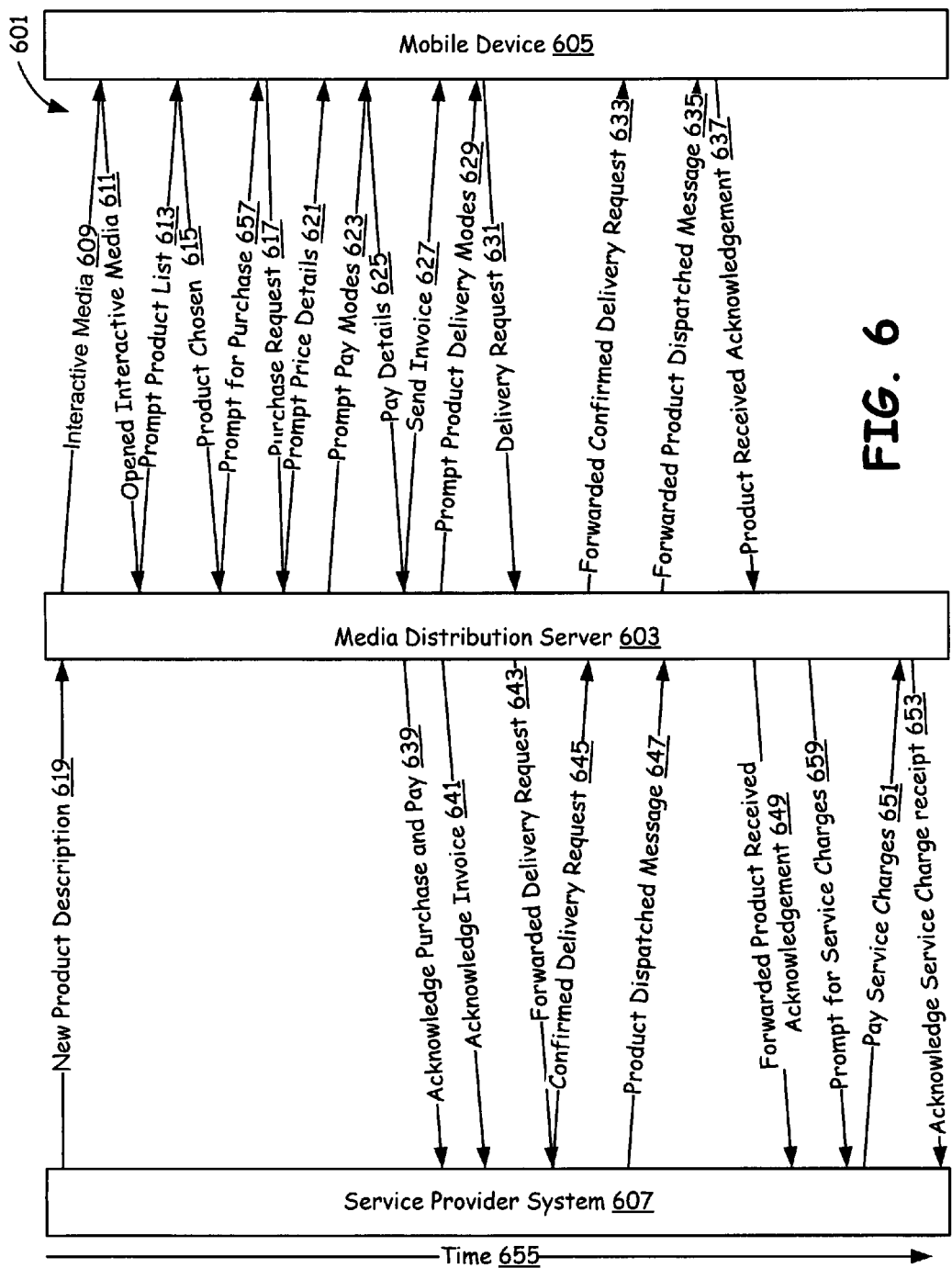
FIG. 6 is an interaction flow diagram describing an exemplary handshake between a mobile device, a media distribution server and a service provider system.

FIG. 6 is an interaction flow diagram describing an exemplary handshake between a mobile device 605, a media distribution server 603 and a service provider system 607. The exemplary handshake is associated with a mobile purchase event initiated by a user of the mobile device 605, such as by the selection of a purchase option by the user on a screen presented comprising a product or service details with a multiple choice selection comprising a purchase option. This interaction and flow of associated information over appropriate communication protocols is set up by a workflow manager associated with the media distribution server 603. Thus, an option to purchase an item currently on display on the mobile device is provided to a mobile user.

In general, the workflow manager associated with the media distribution server 603 receives inputs from different entities and responds appropriately. It prompts an entity (for e.g. a mobile device) with a query and receives its response. In one embodiment of the present invention, tagged media control information, message options, etc. (using a web programming language code for example) is communicated to the mobile device 605. The web programming language code also comprises another piece of code which runs from the mobile device screen. When this piece of code executes on the mobile device screen, it collects all the interaction information and sends it back as the response from the mobile device to the media distribution server. The media distribution server then presents it to the workflow manager, which determines the succeeding step in a work flow. Similarly, the media distribution server 603 also communicates a second code comprising appropriate queries and messages and even some control information ) to the service provider system 607 or a content provider system. The second code that is sent by the media distribution server 603 running on the service provider system 607 or the content provider system collects all the interaction information needed and sends it back to the media distribution server 603 for processing.

In general, an interactive media list is delivered to the user of the mobile device 605 on a welcome screen/splash screen of a client application in accordance with the present invention. Based upon this list, the user makes a selection of the interactive media of his interest and starts interacting with the presented interactive media, by choosing different portions, providing user inputs, and triggering audio information play, video information display, graphics display, multiple choice selections, etc. The user interaction depends on the screen view presented to the user on his mobile, some of which is in response to the user's previous interaction.

The generation of the interactive media starts with the service or the content providers delivering the product details comprising product or service parameters to the media distribution server 119 of FIG. 1 is a perspective block diagram of the network 101 containing a media distribution server, mobile device and service and content provider system, in accordance with the present invention. For example, The parameters provided describe a new product, new service or a new interactive media.

The interaction diagram 601 of FIG. 6 explains the interaction sequence involved between a media distribution server 603 (such as 119 of FIG. 1 is a perspective block diagram of the network 101 containing a media distribution server, mobile device and service and content provider system, in accordance with the present invention), a mobile device 605 (such as the device 109 of FIG. 1 is a perspective block diagram of the network 101 containing a media distribution server, mobile device and service and content provider system, in accordance with the present invention), and the service provider system 607(such as 115 of FIG. 1 is a perspective block diagram of the network 101 containing a media distribution server, mobile device and service and content provider system, in accordance with the present invention). Each of the emerging skewed arrows from an entity indicates information flow associated with a current response corresponding to a current screen displayed on the mobile device. The skew in the arrow lines indicates exemplary time dependencies in the interaction process as the information flow are presented in an exemplary timeline 655 to indicate the chronology of actions taking place in the FIG. 6.

In one embodiment, the service provider system 607 provides the new product description information 619 to the media distribution server 603. The product and services description module 141 of FIG. 1 is a perspective block diagram of the network 101 containing a media distribution server, mobile device and service and content provider system, in accordance with the present invention generates new interactive media and puts it into the new interactive media queue 135 of FIG. 1 is a perspective block diagram of the network 101 containing a media distribution server, mobile device and service and content provider system, in accordance with the present invention. The media distribution server 603 delivers this interactive media 609 from the new interactive media queue 135 of FIG. 1 is a perspective block diagram of the network 101 containing a media distribution server, mobile device and service and content provider system, in accordance with the present invention on a welcome screen to the mobile device 605. A mobile user selects an interactive media item from the list presented. This selection response is communicated to the media distribution server 603 as an open interactive media 611 message, in response to which the media distribution server 603 delivers the next portion of interactive media in which it presents a message 613 prompting the user ti make a selection from a product list. On an associated screen, the user makes a selection, to respond with a product chosen 615 message, which is communicated back to the media distribution server 603. On a next portion of the interactive media delivered by media distribution server 603, there is a message 657 containing a purchase option. In response to this portion of interactive media, the user responds by a selecting the purchase option and thereby making purchase request 617, communicating the message to the media distribution server 603.

The purchase request is made by selecting the product from the product list on its screen which opens a new screen containing the multiple choices such as "purchase", "not interested", "interested", and "store in wishlist". Mobile user selects the "purchase" option using softkeys on his mobile device keypad. This results in conveying a purchase request 617 message to the media distribution server.

Upon receiving the signal 617, the media distribution server generates next portion of the interactive media (to be displayed in a next screen to the user, for example). For example, this next portion of the interactive media may prompt the mobile user to approve of a purchase order, representing the user with the detailed price information 621 message. It may also subsequently prompt the user to provide pay mode details 623. For example, the user may be presented with a screen prompting the user to provide approval on the price and specify the mode of payment. The mobile user provides the online pay details 625 information which is communicated back to the media distribution server 603. In response to the pay details sent by mobile user the media distribution server 603 sends such invoice details information 627 and at the same it delivers acknowledge purchase and pay message 639 to the service provider system 607. Subsequently the media distribution server 603 dispatches acknowledge invoice message 641 to the service provider system 607 and initiates product delivery modes message 629 to the mobile device 605.

Basically the product delivery mode is the way through which the product is going to be delivered to the mobile device user. The user is prompted with multiple choice options to be selected by the user. The user makes a selection generating the delivery request message 631 to the media distribution server 603. The media distribution server 603 forwards this message as a forwarded delivery request 643 to the service provider system 607. Upon receiving the message 643 the service provider 607 delivers the confirmed delivery request 645 message to the media distribution server, which it forwards to the mobile device as a forwarded confirmed delivery request message 633.

On the day or time when the service provider dispatches the mobile purchased product for delivery to the mobile user, the service provider system 607 communicates a product dispatched message 647 to the media distribution server 603, which it delivers as the forwarded product dispatched message 635 to the mobile user. On the day or time when the user receives the product, the mobile device 603 (actually the appropriate client application in the mobiledevice 605) sends a product received acknowledgement message 637 to the media distribution server 603, which the media distribution server 603 delivers as a product received acknowledgement message 649 to the service provider system 607.

Once the media distribution server 603 sends the product received acknowledgement to the service provider, it starts processing the service charges due to the service provider. It prompts for details of service charges sending the message 659 to the service provider system 607, in response to which the service provider system 607 communicates service charges online along with paid service charge message 651 delivered to the media distribution server 603. The media distribution server 603 confirms the receipt of the service by acknowledging the service provider with a message 653. This completes the chronology of the purchase workflow managed by the workflow manager associated with the media distribution server 603.

Figure 7:
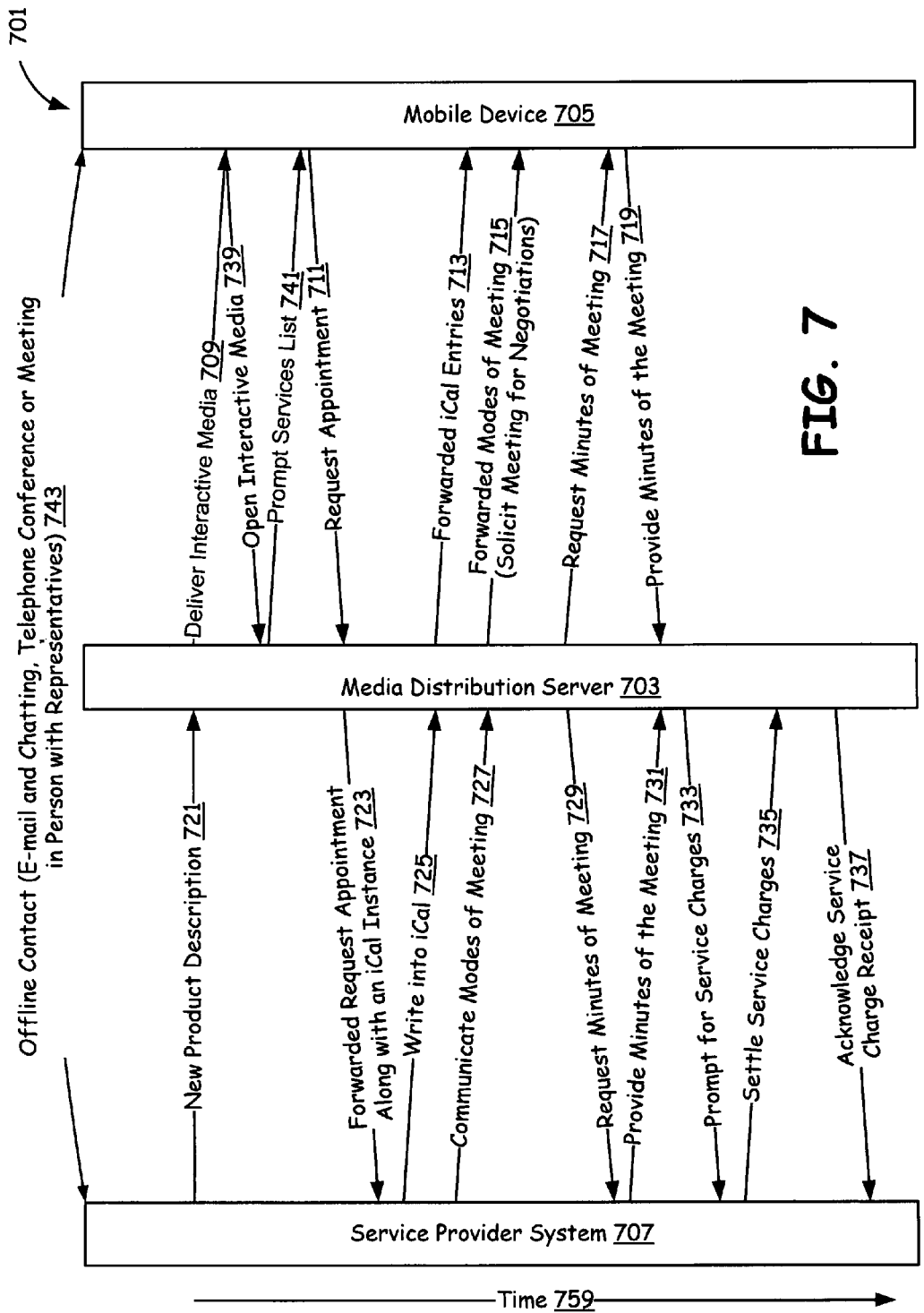
FIG. 7 is an interaction diagram describing an exemplary handshake during an online appointment scheduling interaction between a media distribution server, a service provider system and a mobile device in accordance with the present invention.

FIG. 7 is an interaction diagram describing an exemplary handshake during an online appointment scheduling interaction between a media distribution server 703, a service provider system 707 and a mobile device 705 in accordance with the present invention. A generated interactive media list is delivered to the mobile device 705 on a welcome screen. Upon this the user makes the selection of the interactive media of his interest and starts interacting by choosing from the presented options or multiple choice selections. Upon making the selections from the welcome screen interaction flow is likely to be dependent on the selections made. In one embodiment, the users interaction depends on the screen view delivered on his mobile device in response to his previous interaction on which the set of option buttons keep changing from screen to screen (see FIG. 5) depending on the requirement. A workflow manager (such as the workflow manager 145 of FIG. 1 is a perspective block diagram of the network 101 containing a media distribution server, mobile device and service and content provider system, in accordance with the present invention) associated with the of media distribution server 703 decides the flow of interactions or the chronology of the exchanged messages and control information tagged and sent using appropriate code, and accordingly the mobile screens are modified and delivered to the mobile device 605.

Figure 8:
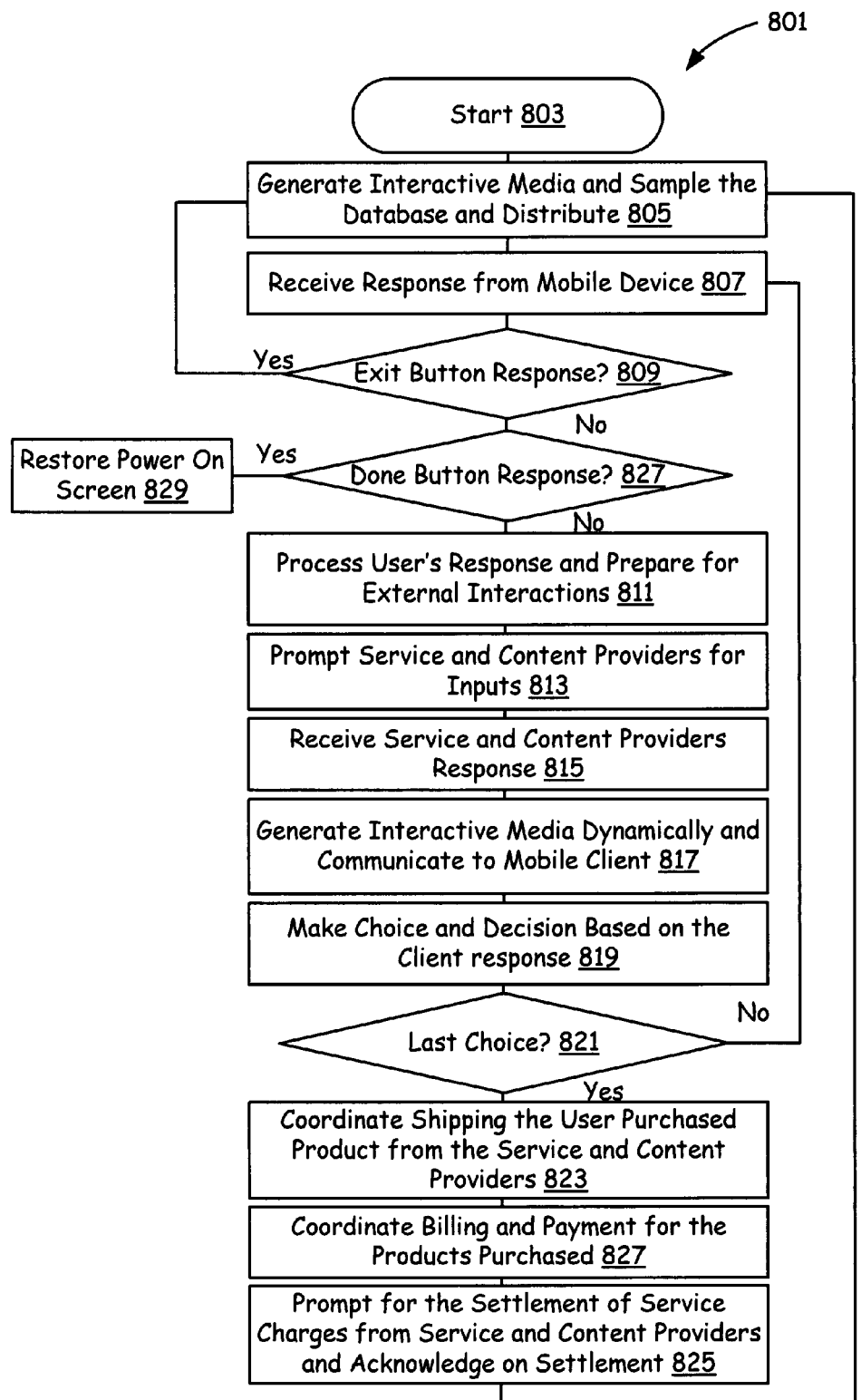
FIG. 8 is a flowchart for the action performed by the media distribution server during the delivery of an interactive media to the mobile device, wherein the mobile device comprises a client capable of displaying the interactive media, in accordance with the present invention.

FIG. 8 is a flowchart for the action performed by the media distribution server during the delivery of an interactive media to the mobile device, wherein the mobile device comprises a client capable of displaying the interactive media, in accordance with the present invention. In general, the media distribution server receives the product and service description parameters from the service or the content providers and generates the interactive media. Newly generated interactive media are stored in a new interactive media queue 135 of FIG. 1 is a perspective block diagram of the network 101 containing a media distribution server, mobile device and service and content provider system, in accordance with the present invention. The media distribution server 119 of FIG. 1 is a perspective block diagram of the network 101 containing a media distribution server, mobile device and service and content provider system, in accordance with the present invention samples the new interactive media queue and delivers all the new interactive media as a list to the mobile devices. Initially, a user responds by selecting the interactive media list from the welcome screen and optionally selecting specific interactive media for further interaction. Any selection or the request made by the mobile device user 109 of FIG. 1 is a perspective block diagram of the network 101 containing a media distribution server, mobile device and service and content provider system, in accordance with the present invention is communicated to the media distribution server 119 of FIG. 1 is a perspective block diagram of the network 101 containing a media distribution server, mobile device and service and content provider system, in accordance with the present invention. While viewing and interacting with the currently displayed interactive media, the user can select exit or done button to go back to the welcome or the power-on screen, respectively.

The media distribution server receives the user response when the user selects any of the multiple choice or option buttons on a screen. Then the media distribution server prepares a next screen or message, or a next portion of the interactive media and delivers it to the mobile device for display to the user. In this process it also receives external inputs from the service or the content providers, whenever required. The media distribution server modules process the external and the user inputs and generate the interactive media that is subsequently delivered to the user on the mobile device.

In general, the user interacts with the interactive media (actually the client displaying the interactive media) on the mobile device, making choices, selecting from presented options, such selections made using the joystick and/or the softkeys provided on the mobile device keypad. Each time the user makes a choice from a screen it is either collated for subsequent delivery or immediately communicated back to the media distribution server. A new screen with a next portion of the interactive media is then presented to the user, or a new information/message is generated dynamically and delivered to the user by the media distribution server.

Processing of a user's request for an interactive media starts at a start block 803. At next block 805 the media distribution server generates the interactive media based on the external inputs provided by the service or content providers. It distributes the generated interactive media to the mobile devices. At next block 807, the media distribution server receives response or inputs (or control information for generation of a next portion of an interactive media, or a next screen generation or action) from the mobile device user. Based on this response or user input, the media distribution server generates a next portion of an interactive media or performs the next action.

At the subsequent decision block 809 the media distribution server checks whether the user has responded by selecting the "exit" button. If the user has responded by selecting the exit button, the processing continues at a next block 805 to delivers the welcome screen with the interactive media list. Otherwise, processing continues at the next decision block 827 where the distribution server checks whether a "done" button is selected by a user.

If at the block 827, the media distribution server finds that the done button has been selected, then the media distribution server delivers the power on screen at a next block 829; else it processes the user's response and prepares for external interactions (with the service or the content providers) in a next block 811.

Then, at the next block 813, the media distribution server prompts service or the content providers for the external inputs and receives them at a next block 815. Subsequently at a next block 817, it updates interactive media with new inputs and delivers them on the mobile device again as a next portion of an interactive media, or as a new screen with new message on it. It receives the user's options and makes decision to generate the next screen at a next block 819. At next decision block 821 the media distribution server checks whether the current interaction is the last one needed in accomplishing the task, such a purchase, a product trial request, etc. If not, processing is passed to the next block 807 to receive the mobile users response and continues; else processing continues at a next block 823 where the media distribution server prepares to coordinate assembling of a shipping information. For example, information related to shipping of the purchased item is assembled by interacting both with the mobile device user and the service or the content providers.

At the next block 827 the media distribution server coordinates the billing of the purchased items and settlement of the payment. Subsequently at a next block 825 the media distribution server prompts for the settlement of the service charges, in response to which the service or the content providers makes arrangement for online settlement of service charges. The receipt of service changes is acknowledged by the media distribution server. Then, the processing continues at the block 805 where the whole sequence of the operation is repeated.

Figure 9:
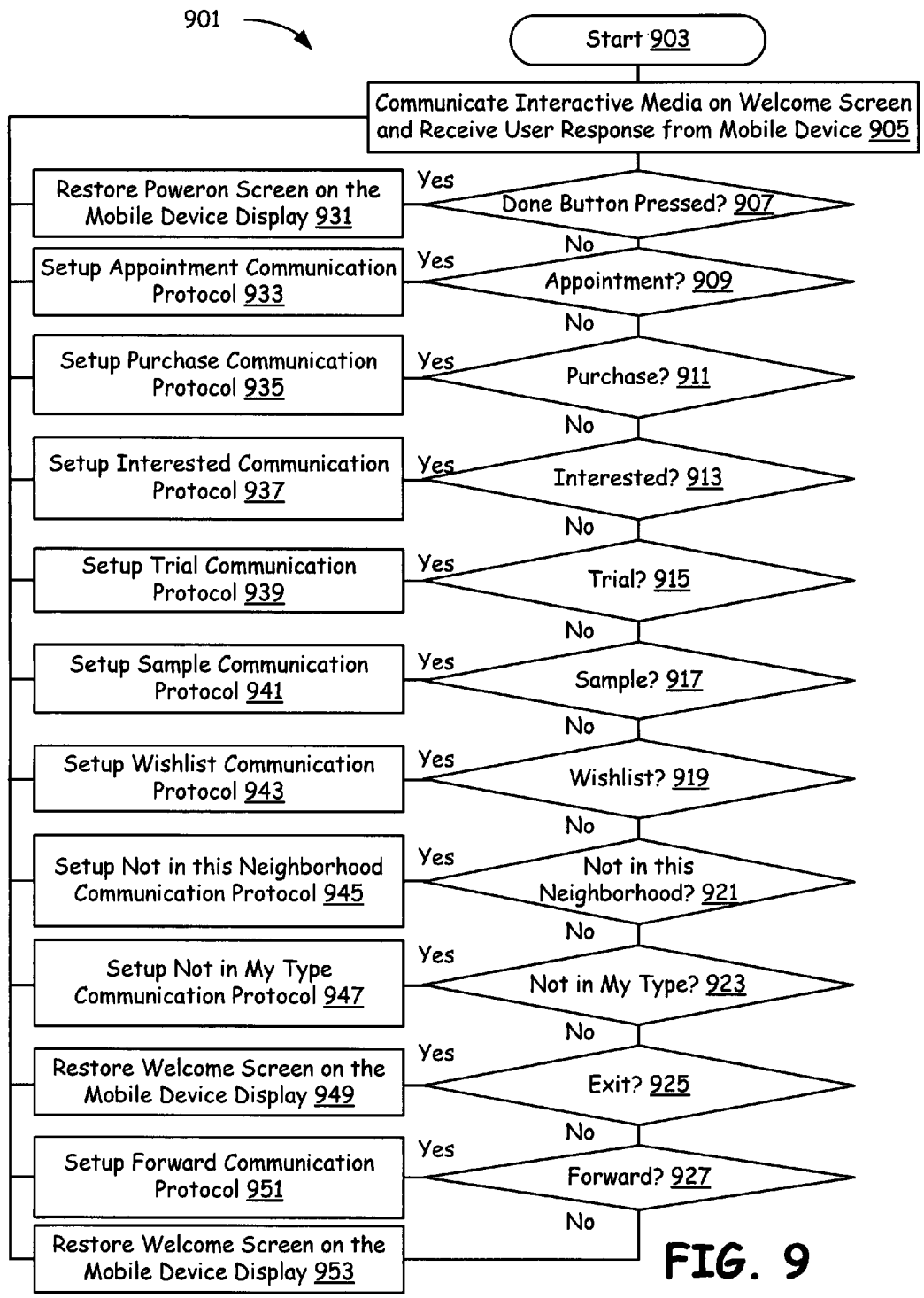
FIG. 9 is a flowchart for actions performed by workflow manager of a media distribution server, in accordance with the present invention.

FIG. 9 is a flowchart for actions performed by workflow manager of a media distribution server, in accordance with the present invention. For example, the workflow manger 145 of the media distribution server 119 of FIG. 1 is a perspective block diagram of the network 101 containing a media distribution server, mobile device and service and content provider system, in accordance with the present invention sets up the required communication protocol for the exchange of messages and control information across the network between the media distribution server and the mobile device; and between the media distribution server and the service or the content providers systems. The portions of the interactive media displayed in relevant mobile device screens, that is generated and delivered to the mobile devices, depends on the choices a mobile user selects from the current screen. Important multiple choices in this exemplary description of workflow manager operation are the "appointment", "purchase", "interested", "trial", "store in wishlist", "not in this neighborhood", and "not my type", in accordance with the present invention.

On selection of any one of these multiple choice item a predefined sequence of the message and control information exchange takes place using the web programming code (for e.g. XML) results in a predefined sequence of the screens delivered to the mobile device to accomplish a predefined task (for e.g. an online purchase).

Flowchart 901 of FIG. 9 describes an exemplary operation performed by the workflow manager 145 of the media distribution server 119 of FIG. 1 is a perspective block diagram of the network 101 containing a media distribution server, mobile device and service and content provider system, in accordance with the present invention. The process starts at a block 903. Then, at a next block 905 the workflow manager delivers a message in the form of interactive media list that is typically presented to a mobile device user on a welcome screen, such as on the mobile device 109 of FIG. 1 is a perspective block diagram of the network 101 containing a media distribution server, mobile device and service and content provider system, in accordance with the present invention. In response to this, the work flow manager instructs the media distribution server 119 collects user response, such as a user response provided after opening an interactive media screen and the selecting option buttons on it. Upon receiving the selected option information from the mobile device, at a next decision block 907 it tests whether the option selected is the "done" button from a current screen. If it is found to be true, then it process the next screen as the power-on screen at the block 931 to deliver to the mobile device, otherwise processing continues at a next decision block 909.

At the decision block 909 it tests whether the selected option is an online "appointment" button. If it is true, then the workflow manager 145 of FIG. 1 is a perspective block diagram of the network 101 containing a media distribution server, mobile device and service and content provider system, in accordance with the present invention sets up an "appointment" communication protocol at the block 933 and the corresponding chronology of actions are prompted to accomplish that task, otherwise it goes to the next decision block 911. If it's found to be a "purchase" option made by the user at 911, then the workflow manager 145 of FIG. 1 is a perspective block diagram of the network 101 containing a media distribution server, mobile device and service and content provider system, in accordance with the present invention sets up "purchase" communication protocol at the block 935 and the corresponding chronology of actions are prompted to accomplish that task, otherwise, the processing proceeds to a next decision block 913.

In the decision block 913, if it's determined that the multiple choice selection by the user is an "interested" option selected by the user, then the workflow manager 145 of FIG. 1 is a perspective block diagram of the network 101 containing a media distribution server, mobile device and service and content provider system, in accordance with the present invention sets up "interested" communication protocol at the block 937 and the corresponding chronology of actions are prompted to accomplish that task, otherwise processing proceeds to a next decision block 915. At the decision block 915, if it's determined that the multiple choice selection made by a user is a "trial" option made by the mobile user, the workflow manager module 145 of FIG. 1 is a perspective block diagram of the network 101 containing a media distribution server, mobile device and service and content provider system, in accordance with the present invention sets up "trial" communication protocol at the block 939 and the corresponding chronology of actions are prompted to accomplish that task, otherwise, processing proceeds to a next decision block 917.

At the decision block 917, if it's found to be "sample" option made by the user, then the workflow manager 145 of FIG. 1 is a perspective block diagram of the network 101 containing a media distribution server, mobile device and service and content provider system, in accordance with the present invention sets up "sample" communication protocol at the block 941 and the corresponding chronology of actions are prompted to accomplish that task, else it goes to the next decision block 919. At the decision block 919, if it's found to be the "wishlist" option made by the mobile user, the workflow manager module 145 of FIG. 1 is a perspective block diagram of the network 101 containing a media distribution server, mobile device and service and content provider system, in accordance with the present invention sets up "wishlist" communication protocol at the block 943 and the corresponding chronology of actions are prompted to accomplish that task, otherwise processing proceeds to a next decision block 921.

In the decision block 921, if it's determined that the multiple choice selection made by a user is "not in this neighborhood" option, the workflow manager 145 of FIG. 1 is a perspective block diagram of the network 101 containing a media distribution server, mobile device and service and content provider system, in accordance with the present invention sets up "not in this neighborhood" communication protocol at the block 945 and the corresponding chronology of actions are prompted to accomplish that task, otherwise processing proceeds to a next decision block 923. At the decision block 923, if it's determined that the user's multiple choice selection is "not my type" option made by the mobile user, the workflow manager 145 of FIG. 1 is a perspective block diagram of the network 101 containing a media distribution server, mobile device and service and content provider system, in accordance with the present invention sets up "not in my type" communication protocol at the block 947 and the corresponding chronology of actions are prompted to accomplish that task, otherwise processing proceeds to a next decision block 925.

At decision block 925, if it is determined that the multiple choice selection or user selection of a menu item is an "exit" option selected by the user, then the workflow manager 145 of FIG. 1 is a perspective block diagram of the network 101 containing a media distribution server, mobile device and service and content provider system, in accordance with the present invention restores welcome screen on the mobile display at the block 949, otherwise processing proceeds to a next decision block 927. At the decision block 927, if it is determined that the user selection of a multiple choice set presented or a user selection of a menu item displayed is a "forward" option, the workflow manager module 145 of FIG. 1 is a perspective block diagram of the network 101 containing a media distribution server, mobile device and service and content provider system, in accordance with the present invention sets up "forward" communication protocol at the block 951 and the corresponding chronology of actions are prompted to accomplish that task, otherwise processing proceeds to a next block 953 where it restores the welcome screen on the mobile device display. Then, from the block 953 processing proceeds to the next block 905 from where it continues again.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A media distribution server communicatively coupled to a plurality of mobile devices, the media distribution server comprising:
a server interface for interactions with a service provider system or a content provider system and for receiving an interactive media;
the media distribution server delivering a first portion of the interactive media to the plurality of mobile devices;
the media distribution server receiving responses to the first portion of the interactive media from the plurality of mobile devices and collating the responses; and
the media distribution server conducting one or more follow up interactions with the service provider system or the content provider system based on the responses received to the first portion of the interactive media.

2. The media distribution server of claim 1 wherein the responses to the first portion of the interactive media comprise multiple choice selections made by users.

3. The media distribution server of claim 2 wherein the multiple choice selections comprise selections to make an appointment, selections to make a purchase or selections soliciting additional information.

4. The media distribution server of claim 1 further comprising:
the media distribution server dynamically assembling a next portion of the interactive media in reaction to the responses to the first portion of the interactive media received from at least one of the plurality of mobile devices, for delivery to the at least one of the plurality of mobile devices.

5. The media distribution server of claim 4 wherein the next portion of the interactive media comprises one or more of text, an audio clip, graphics, and a video clip.

6. The media distribution server of claim 1 further comprising:
a workflow manager;
the workflow manager coordinating the assembly of a next portion of the interactive media and associated metadata for delivery to at least one of the plurality of mobile devices based on a response received from the at least one of the plurality of mobile devices.

7. The media distribution server of claim 1 wherein the media distribution server dynamically assembles the first portion of the interactive media as a combination of a text, a graphics an audio and a video clip that are collectively delivered as a tagged message along with an optional program code for processing and display by at least one of the plurality of mobile devices.

8. The media distribution server of claim 1 further comprising:
a dynamic media development module for assembling interactive media;
the dynamic media development module receiving inputs from at least one of the plurality of mobile devices, the service provider system and the content provider system and assembling the interactive media; and the dynamic media development module inserting an advertisement comprising at least one of text, graphics, an audio clip and a video clip into the interactive media for delivery to the at least one of the plurality of mobile devices.

9. The media distribution server of claim 8 further comprising:
a product trial manager; and
the product trial manager facilitating a trial of a product or a service presented in at least one portion of the interactive media.

10. The media distribution server of claim 8 further comprising:
a webserver calendar module that facilitates creation or registration of an appointment made by the service provider system or the content provider system, in response to a request to make an appointment from a user of one of the plurality of mobile devices.

11. The media distribution server of claim 8 wherein the dynamic media development module receives inputs provided by a mobile user of one of the plurality of mobile devices and assembles, based on content and information provided by one or both of the service provider and the content provider, new interactive media for delivery to the mobile user.

12. The media distribution server of claim 11 wherein the inputs provided by the mobile user as a response to a query message sent by the media distribution server in the new interactive media comprises a multiple choice selection.

13. The media distribution server of claim 12 wherein the inputs provided by the mobile user to the query message is communicated to one of a service provider system and a content provider system.

14. The media distribution server of claim 1 wherein the media distribution server selectively delivers with the first portion of the interactive media one or both of metadata and configuration information to indicate to a receiving mobile device when an advertisement is to be played in relation to presentation of the first portion of the interactive media.

15. The media distribution server of claim 14 wherein when the advertisement is to be played is selected from the group comprising before, during, and after presentation of the first portion of the interactive media.

16. The media distribution server of claim 1 wherein the media distribution server presents supplementary information to the user, when requested, wherein the supplementary information provides additional details regarding interactive media or a subset thereof currently displayed.

17. The media distribution server of claim 1 wherein the media distribution server comprises a product trial manager that facilitates selection of a product or service trial by soliciting a trial period comprising one or both of a start of trial date and an end of trial date, and wherein the product trial manager manages delivery of a product or a service for such a trial.

18. The media distribution server of claim 17 wherein the product trial manager tracks trial duration and user feedback regarding the product or service on trial by a user during the trial period, for further follow up actions.

19. The media distribution server of claim 1 wherein a user response received from a mobile device in response to presented interactive media is in the form of an audio response.

20. The media distribution server of claim 1 wherein the media distribution server dynamically generates interactive media by converting one or both of a generic mobile transaction and a generic online transaction initiated by a service provider into a specific set of tasks.

21. The media distribution server of claim 20 wherein the specific set of tasks comprises one or more of the following mobile facilitated activities: purchase of a product, request for an appointment, set up of a trial of a sample product or service, terminate a trial of a sample product or service, and process feedback from user.

22. The media distribution server of claim 1 wherein the media distribution server facilitates requesting an appointment in response to interactive media presented on a mobile device of a user, and wherein the appointment request is communicated by the media distribution server to an external server which provides an appointment schedule that is communicated back to the mobile device of the user by the media distribution server.

* * * * *